United States Patent
Miyamoto et al.

(10) Patent No.: US 8,140,966 B2
(45) Date of Patent: Mar. 20, 2012

(54) COMPUTER SYSTEM, METHOD AND PROGRAM FOR GENERATING CAPTION BASED COMPUTER DATA

(75) Inventors: Kohtaroh Miyamoto, Fuchu (JP); Midori Shoji, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 11/258,567

(22) Filed: Oct. 25, 2005

(65) Prior Publication Data

US 2006/0100883 A1 May 11, 2006

(30) Foreign Application Priority Data

Oct. 25, 2004 (JP) ................................. 2004-309768

(51) Int. Cl.
*G06F 17/21* (2006.01)
(52) U.S. Cl. ......... 715/256; 715/255; 715/257; 715/258
(58) Field of Classification Search .................. 715/256
See application file for complete search history.

(56) References Cited

U.S. PATENT DOCUMENTS

| | | | | |
|---|---|---|---|---|
| 5,173,854 | A * | 12/1992 | Kaufman et al. ............. | 715/222 |
| 6,453,281 | B1 * | 9/2002 | Walters et al. ................ | 704/200 |
| 6,505,153 | B1 * | 1/2003 | Van Thong et al. ........... | 704/211 |
| 6,611,802 | B2 * | 8/2003 | Lewis et al. ................... | 704/235 |
| 6,721,490 | B1 * | 4/2004 | Yao et al. ....................... | 386/69 |
| 6,915,258 | B2 * | 7/2005 | Kontonassios ................. | 704/233 |
| 7,230,920 | B1 * | 6/2007 | Stratigakis .................... | 370/230 |
| 2001/0025241 | A1 * | 9/2001 | Lange et al. .................. | 704/235 |
| 2002/0136529 | A1 * | 9/2002 | Yamashita et al. ............ | 386/52 |
| 2004/0093220 | A1 * | 5/2004 | Kirby et al. ................... | 704/278 |
| 2004/0162966 | A1 * | 8/2004 | Webb et al. ................... | 712/214 |
| 2005/0108010 | A1 * | 5/2005 | Frankel et al. ................ | 704/235 |

FOREIGN PATENT DOCUMENTS

JP  2001060192  3/2001

OTHER PUBLICATIONS

"Parliamentary Meeting Minute Creation Support System, An Effective rewriting environment based on the AmiVoice voice recognition engine"; Masami Nakamura; [online}; retrieved on Oct. 26, 2010; from www.advanced-media.com.jp/english/company/recognition.html JPO Office Action Jul. 1, 2008; AmiVoice Article; publication date: Oct. 2, 2004; vol. 17. No. 12; pp. 38-43 in Japanese; English Abstract provided.

* cited by examiner

*Primary Examiner* — Laurie Ries
*Assistant Examiner* — Zaida Marrero
(74) *Attorney, Agent, or Firm* — Cantor Colburn LLP; Steven Chiu

(57) ABSTRACT

A computer system, method and program is generated for editing text data, which have been created on a basis of a voice or a video image. In one embodiment, a first computer for outputting voice or video image(s), and for identifying a part of text data, which needs to be edited, in response to a received instruction is provided. A second computer for outputting voice or video image, and for editing the part, which has been identified by the first computer, in response to said received instruction is also provided. A mouse and keyboard can also be incorporated into the invention.

10 Claims, 23 Drawing Sheets

(a)

| SOREDEWA JIKAN NI NARIMASHITANODEG<u>A</u> SHAKAINI TSUUYOUSURURONBUN NO KAKIKATANO SEMINA-HAJIMETAITO OMOIMASU. HOSAKI WO URIAGEJOU O WATTABAKARINANDESU KEREDOMO CHOTTOJIKAN WO JIPPUN HODO O-BA-<u>MA</u>SHITANODE KONDOWA <u>KAIKETSU</u> SHITAITO OMOIMASU. |
|---|

(b)

| SORE<u>TO</u>KOTO IROWOS<u>HI</u>TA ATO<u>NO</u>MOSHI, USUPO<u>N</u>TOSHI, TOKUNI JYUUYOUNA HAJIME<u>NE</u> <u>KAKUTOKUWASURU</u> TO <u>KONKYOCHI DE HYOUKASHITA</u> TO OMOIMASU SANRAN NO MONONOMODOKITO ITTERUNDESUKEDO<u>TO</u>. ONDONO TSUMAGA <u>RYOUMOKUSHOUKO</u> <u>UTATTAGU</u> NO RONBUNTAKUSAN <u>N</u>, SONOHOUSURUKA KAZUNO HITONO DOUSHOKUSHITA<u>TO</u> OMOIMASU. |
|---|

FIG. 5

(a)
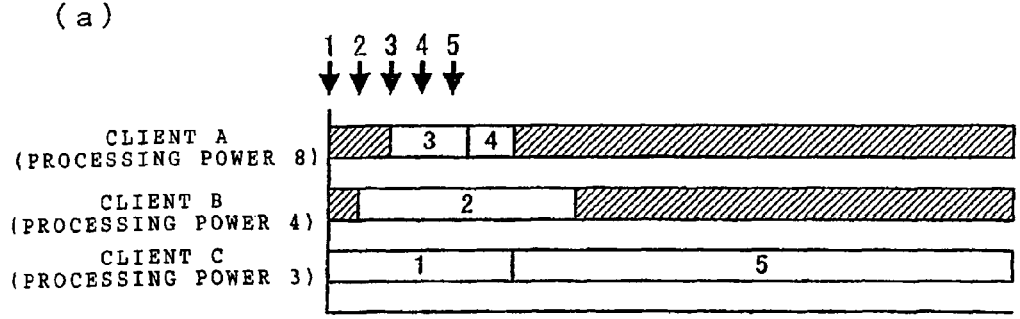
(b)
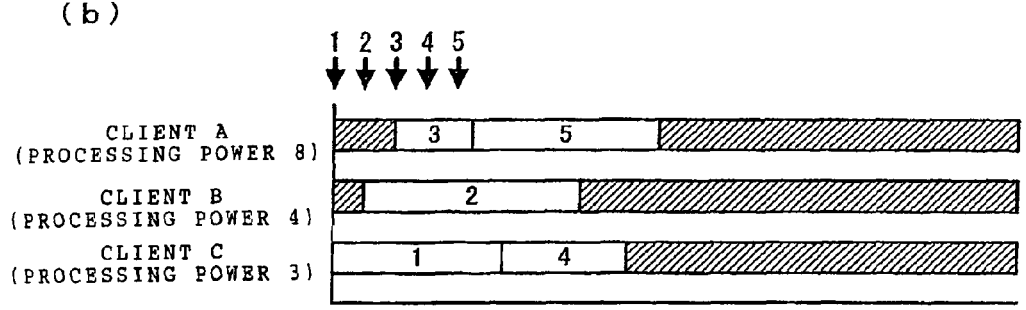
FIG. 10

(a)
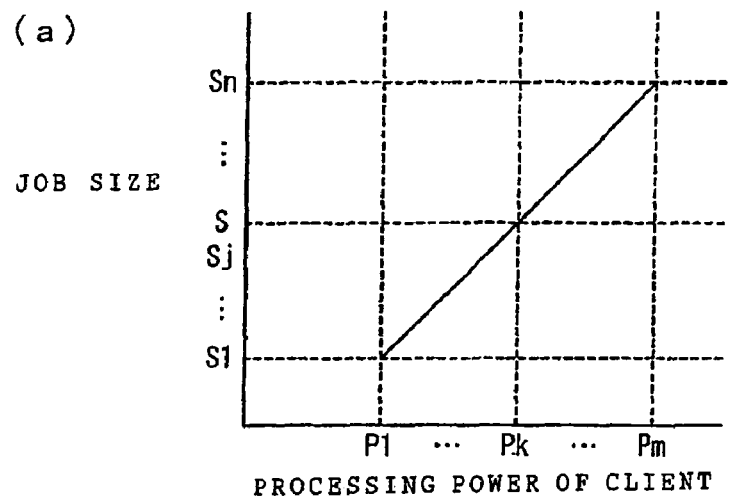
(b)
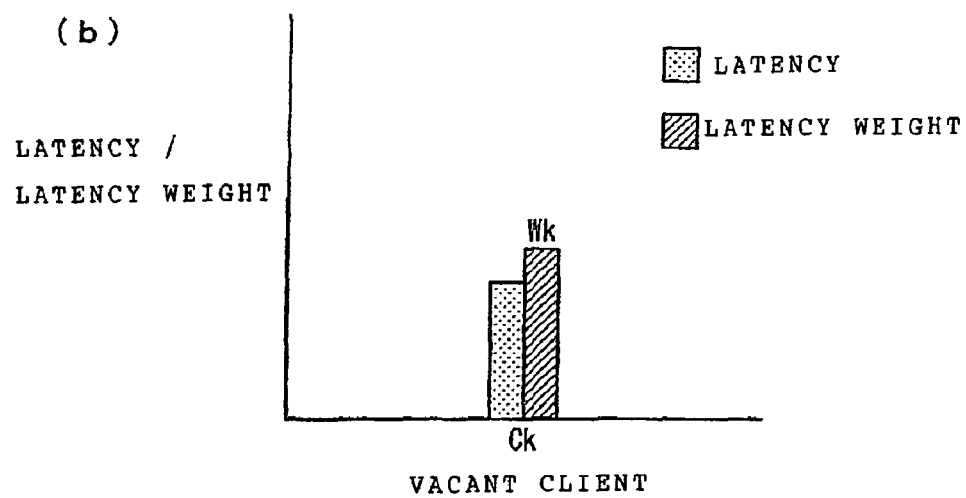
(c)
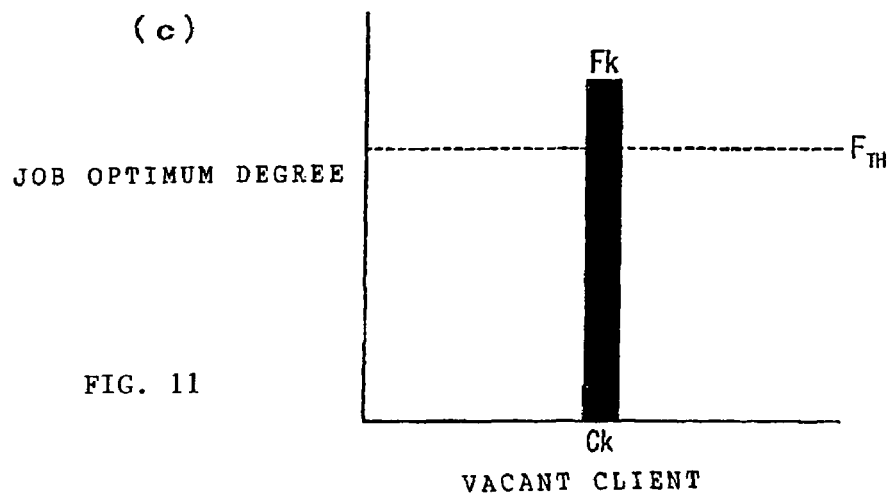
FIG. 11

(a)
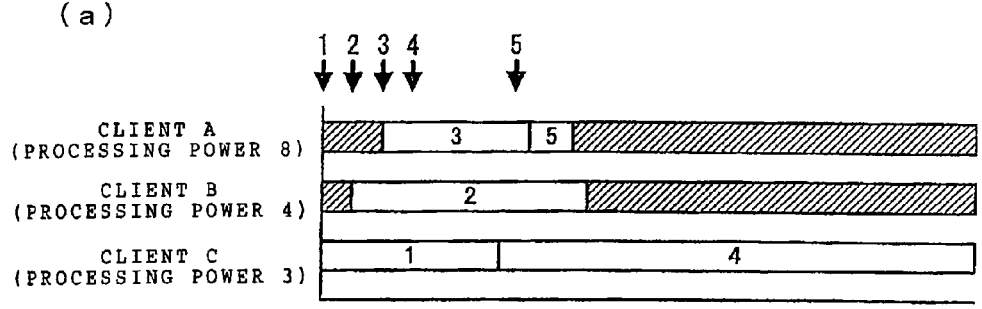
(b)
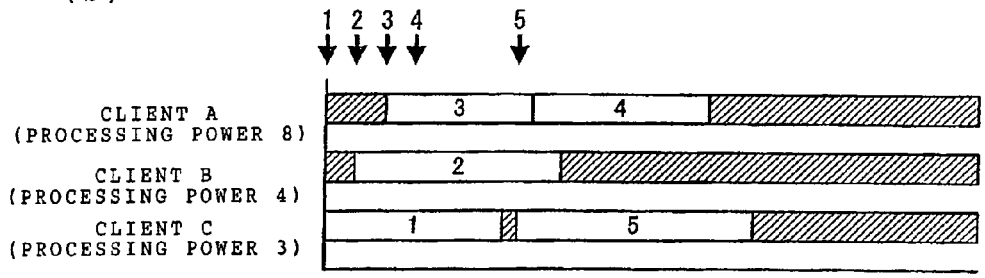
FIG. 12

(a)
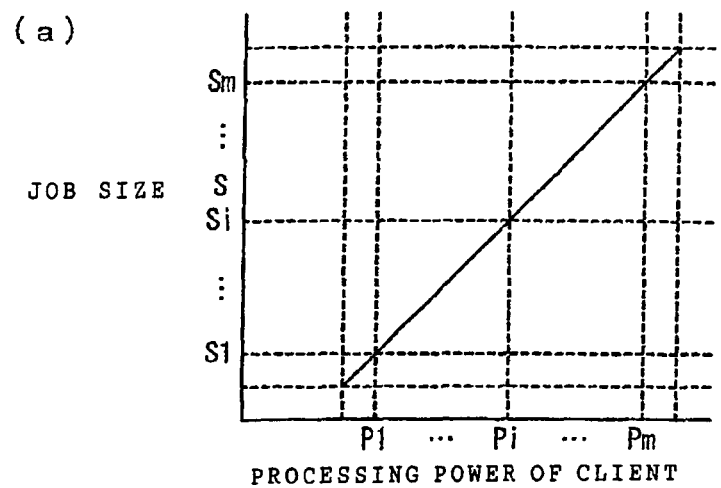
(b)
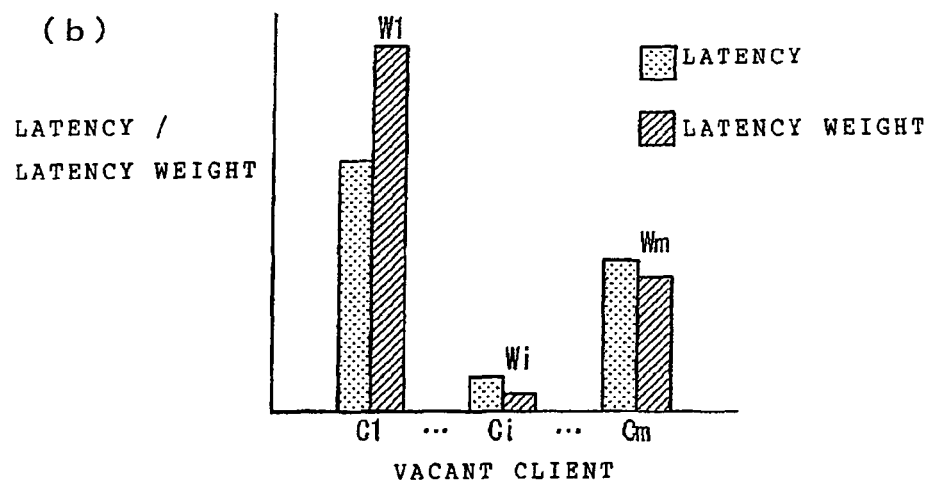
(c)
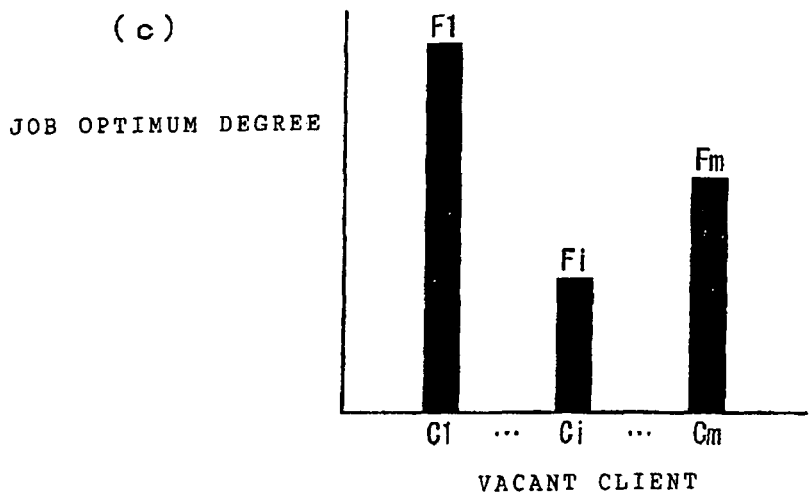
FIG. 13

FIG. 14
(a)
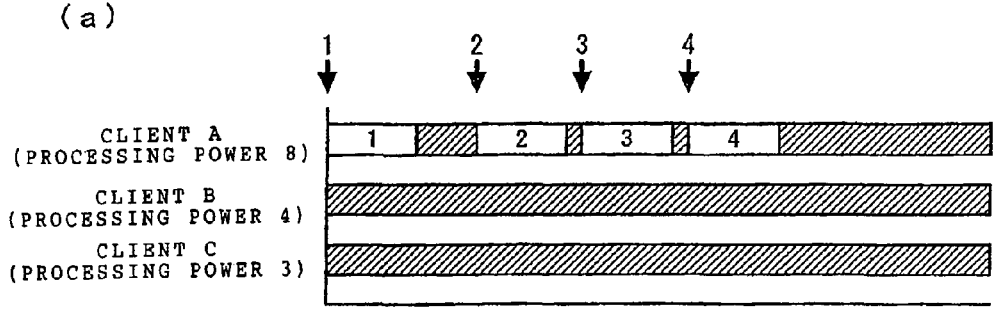
(b)
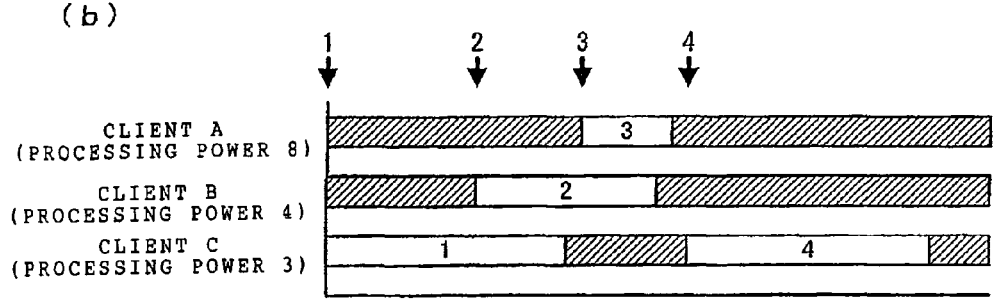
(c)
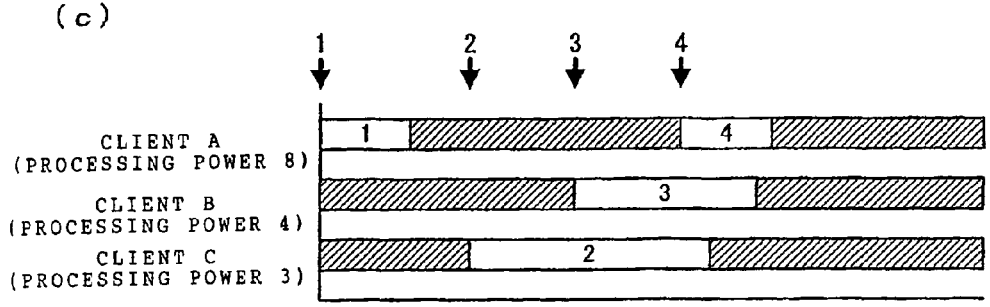

FIG. 16

| LINE | START | VOICE RECOGNITION RESULT |
|---|---|---|
| 1 | 0.949 | IMAMADE |
| 2 | 1.388 | NO |
| 3 | 1.508 | TORIKUMI |
| 4 | 2.007 | GA |
| 5 | 2.715 | ONDEANDO |
| 6 | 3.393 | BIJINESU |
| 7 | 3.922 | WO |
| 8 | 3.982 | JITSUGEN |
| 9 | 4.501 | SURU |
| 10 | 4.790 | UE |
| 11 | 4.930 | DENOKATEI |
| 12 | 5.548 | NI |
| 13 | 5.648 | SUIMASE |

(a)
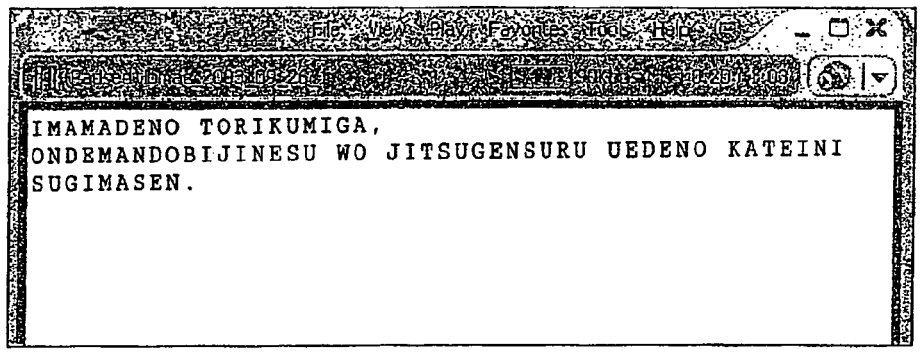
(b)
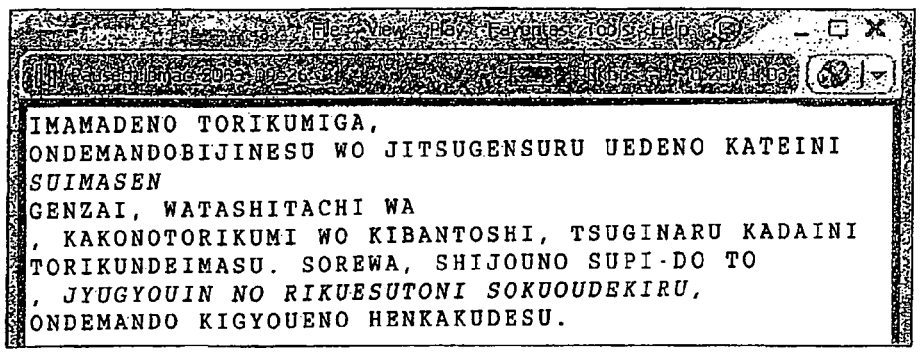
FIG. 21

(a)

| # | HAND (MOUSE) | HAND (KEYBOARD) | EYES | EARS |
|---|---|---|---|---|
| 1 | DESIGNATE REPRODUCTION POINT | | DESIGNATE REPRODUCTION POINT | |
| 2 | REPRODUCE | | REPRODUCE | |
| 3 | | | | HEAR VOICE |
| 4 | STOP VOICE | | STOP VOICE | |
| 5 | POINT INCORRECT LINE | | POINT INCORRECT LINE | |
| 6 | | EDIT INCORRECT LINE | EDIT INCORRECT LINE | |
| 7 | DESIGNATE REPRODUCTION POINT | | DESIGNATE REPRODUCTION POINT | |
| 8 | REPRODUCE | | REPRODUCE | |
| 9 | | | | HEAR VOICE |
| 10 | STOP VOICE | | STOP VOICE | |
| 11 | | EDIT INCORRECT LINE | | |
| 12 | DESIGNATE REPRODUCTION POINT | | DESIGNATE REPRODUCTION POINT | |
| 13 | REPRODUCE | | REPRODUCE | |
| 14 | | | | HEAR VOICE |
| 15 | STOP VOICE | | STOP VOICE | |

(b)

| # | HAND (MOUSE) | HAND (KEYBOARD) | EYES | EARS |
|---|---|---|---|---|
| 1 | CHECK DEGREE OF CERTAINTY | | CHECK DEGREE OF CERTAINTY | REPRODUCTION OF VOICE FOR A SINGLE LINE |

(c)

| # | HAND (MOUSE) | HAND (KEYBOARD) | EYES | EARS |
|---|---|---|---|---|
| 1 | | CORRECT INCORRECT LINE | CORRECT INCORRECT LINE | PERFORM OVERLAP WIDTH REPRODUCTION EMPHASIZING |
| 2 | | CORRECT INCORRECT LINE | CORRECT INCORRECT LINE | DUN VOICE |
| 3 | | CORRECT INCORRECT LINE | CORRECT INCORRECT LINE | DUN VOICE |
| 4 | | ENTER CORRECTION | ENTER CORRECTION | |

```
IMAMADENO TORIKUMIGA ONDEMANDO
BIJINESUWO JITSUGENSURU UEDENO KATEINI
SUGIMASEN.
```

| LINE | START | VOICE RECOGNITION RESULT |
|---|---|---|
| 1 | 0.949 | IMAMADE |
| 2 | 1.388 | NO | ←—INCORRECT COMMA/PERIOD
| 3 | 1.508 | TORIKUMI |
| 4 | 2.007 | GA |
| 5 | 2.715 | ONDEANDO | ←—CORRECT WITH KEYBOARD
| 6 | 3.393 | BIJINESU |
| 7 | 3.922 | WO |
| 8 | 3.982 | JITSUGEN |
| 9 | 4.501 | SURU | ←—INCORRECT COMMA/PERIOD
| 10 | 4.790 | UE |
| 11 | 4.930 | DENOKATEI | ←—CORRECT WITH KEYBOARD
| 12 | 5.548 | NI |
| 13 | 5.648 | SUIMASE | ←—CORRECT WITH KEYBOARD INCORRECT COMMA/PERIOD ined in Patent Document 1, a transcription work for a caption is
COMPUTER SYSTEM, METHOD AND PROGRAM FOR GENERATING CAPTION BASED COMPUTER DATA

BACKGROUND OF THE INVENTION

1. Field of the Invention

The present invention relates to a technology of creating data such as a caption data based on information such as a voice, and more particularly relates to a technology of editing data such as a caption created by a computer.

2. Description of Background

For the purpose of securing accessibility to information to be delivered through broadcasting, a goal has been set that captioning will be appended by the year 2007 to every possible broadcasted program. There will also be increasing need, in the near future, for captioning motion pictures to be delivered on the Internet. In dealing with such a situation, a lot of research has been conducted on the appending of captions to broadcasting and motion pictures.

Prior art contains some such research and a few examples are referred to herein specifically for ease of understanding. Some prior art that points to such research provides for a system for assisting an expert who works on a transcription for captioning. Two examples can be provided. A first example, is described in Japanese Patent Laid-open No. 2003-216200 (Pages 9, 10, FIG. 6), hereinafter referred to as "Patent Document 1", and a second example is described in Japanese Patent Laid-open No. 2003-223200 (Page 8, FIG. 6), hereinafter referred to as "Patent Document 2". According to Patent Document 1, a transcription work for a caption is assisted by means of a specific reproduction operation, while, in Patent Document 2, the work is assisted by means of changing a speech rate.

Another one is about a method for automatically producing a caption by employing a voice recognition technology. Use of this method can eliminate a transcription work for a caption by an expert. Hence, this method is beginning to be expected. However, by use of the current voice recognition technology, it is impossible to create a perfectly correct caption. Therefore, at the end, the expert has to do a work involving checking and editing on a result of voice recognition. Thus the work requires a large number of steps to be completed.

An example of such an editing work will be described with reference to FIG. 23. Here, as depicted in the drawing, suppose there is a voice saying "Imamadeno torikumiga ondemando bijinesu wo jitsugensuru uedeno kateini sugimasen" (phonetically written according to the Japanese phonetic system; this means "Activities until now are a part of the processes in bringing off an on-demand business deal"), and a voice recognition result is obtained as shown in the drawing.

An editor, then, checks the voice recognition result to find out errors while hearing the voice from the beginning. For example, suppose the editor found out that "on-deando" (hereinafter, what is described inside the double quotation marks is a Japanese sentence or word, each being phonetically written according to the Japanese phonetic system, or a symbol, unless otherwise stated) on line 5 should be "on-demando". AT this moment, the editor firstly stops the voice. Then, the editor points the line 5 with a mouse, and moves a keyboard focus to correct "on-deando" to "on-demando".

Here, if the editor forgot how to correct the incorrect word "on-deand," even if the keyboard focus had been moved to the line 5, he/she hears the voice once more, and then corrects "on-deand" To "on-demand."

As described above, a great number of research works have since long been conducted on appending captions to voices. However, the existing technology has the problems as described below.

The first problem is that the existing technology heavily depends on highly skilled labors. A transcription work for a caption is to convert a voice into characters through spelling out of the voice, while hearing the voice. It is, therefore, not possible for a low skilled labor to do the work. Moreover, a work for creating a caption through editing of a voice recognition result is also difficult for the low skilled labor, since the work requires one to quickly carry out the processes of recognizing an error in the voice recognition result, and of determining a correct character string, while hearing the voice. Meanwhile, employing the highly skilled labors will result in a problem of pushing up the labor cost.

The second problem is that not only this causes inefficiencies but the work may be flawed operationally. It is convenient for one to use a mouse since he/she can swiftly operate the mouse in pointing an arbitrary place on a screen. Meanwhile, it is convenient to use a keyboard for inputting characters on the screen. However, on a transcription work for a caption, the reproduction and stop operations for a voice are done with the mouse, while inputting the caption is carried out with the keyboard. In addition, on an editing work for a caption, pointing an incorrect part is done with the mouse, and inputting a correct character string is done with the keyboard. Therefore, when the mouse and the keyboard are concurrently used, a period of time spent in moving an operator's hand back and forth between the mouse and the keyboard will become an overhead.

Incidentally, it has since long been that a part where a voice is being reproduced is not coupled with a part where a transcription work or an editing work for a caption is performed. Furthermore, reproduction of the voice during inputting of characters with the keyboard influences concentration on the inputting. Meanwhile, when an editor forgot a content to be corrected, it was necessary to search through his/her memory, or to explicitly issue a reproduction command. It has, thus, never ever been possible to carry out efficient operations.

SUMMARY OF THE INVENTION

The shortcomings of the prior art are overcome and additional advantages are provided through the provision of the present invention.

It is an object of the present invention to create data such as a caption without relaying only on highly skilled labors, and to cut costs required for such a work.

In addition, it is another object of the present invention to enhance efficiency for creating the data such as a caption, and to shorten the time required for such a work.

In order to achieve the objects described above, in the present invention, two separate devices are provided as follows: one identifies a part required to be edited in a voice recognition result, while the other actually performs editing on that part. That is, a computer system of the present invention is to edit text data created based on a voice or a video image, and includes a first computer and a second computer. The first computer outputs a voice or a video image, and identifies a part to be edited in the text data in response to an external instruction. The second computer outputs a voice or a video image, and edits a part identified by the first computer in response to an external instruction.

Meanwhile, alternatively, there may be provided two devices as follows. One device, which identifies a part that is required to be edited, is assumed as a device which is operated by a pointing device such as a mouse, while the other device, which actually performs editing, is assumed as a device which is operated with a keyboard. Accordingly, it is possible to assume the present invention as a system in which the two devices are separately provided. In this case, the first computer identifies a part to be edited in text data in response to an instruction from the pointing device, while the second computer edits the part thus identified in response to an instruction from the keyboard.

Furthermore, for enhancing an efficiency of an editing work, it is possible to configure that a voice or a video image is coupled with text data. In this case, the second computer outputs a voice or a video image corresponding to a part to be edited, before editing the part.

Furthermore, the present invention is applicable not only in such a scene where a text created from a voice or a video image is edited, but also in various scenes where data generally created based on some information are corrected. In this case, a computer system of the present invention is to assist a work for correcting data created based on given information, while referring to the information, and includes a first computer and a second computer. The first computer outputs the information, and identifies a part to be corrected in response to an external instruction. The second computer outputs information corresponding to the part identified by the first computer, and corrects the part in response to an external instruction.

Incidentally, it is also possible to assume the present invention as a method by which a computer assists a work of correcting data created based on given information, while referring to the information. In this case, the method of the present invention includes the steps of: expediting identification of a part to be corrected in the data by outputting the information, and identifying the part to be corrected; and outputting, thereafter, the information to expedite correction of the part, and correcting the part in response to an external instruction.

Meanwhile, it is also possible to assume the present invention as a program which causes a server computer to achieve predetermined functions. In that case, a program of the present invention causes the server computer to achieve a function to assist a work for correcting data created based on given information while referring to the information. To be more specific, the server computer achieves the following two functions. One is to identify a part to be corrected in data in response to an external instruction, while the other is to instruct a specific client computer among a plurality of client computers so as to correct the identified part.

According to the present invention, it is possible to create data such as a caption without relying only on highly skilled labors, and to cut costs for such a work.

Additional features and advantages are realized through the techniques of the present invention. Other embodiments and aspects of the invention are described in detail herein and are considered a part of the claimed invention. For a better understanding of the invention with advantages and features, refer to the description and of the drawings.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 is a diagram for explaining a job size according to the embodiment of the present invention.

FIGS. 10(a) and 10(b) are diagrams showing effects of the optimum job selection process according to the embodiment of the present invention.

FIGS. 11(a), 11(b), and 11(c) are diagrams for explaining a delay process according to the embodiment of the present invention.

FIGS. 12(a) and 12(b) are diagrams showing effects of the delay process according to the embodiment of the present invention.

FIGS. 13(a) to 13(c) are diagrams for explaining an optimum client selection process according to the embodiment of the present invention.

FIGS. 14(a) to 14(c) are diagrams showing effects of the optimum client selection process according to the embodiment of the present invention.

FIG. 16 is a diagram for explaining an automatic jump function of the keyboard caption editing system according to the embodiment of the present invention.

FIGS. 21(a) and 21(b) are diagrams, each showing a display example of a real time caption according to the second embodiment of the present invention.

FIGS. 22(a) to 22(c) are diagrams, each comparing operation procedures between the present invention and a conventional technology.

FIG. 23 is a diagram for explaining the conventional technology.

DESCRIPTION OF THE INVENTION

Figure 1:
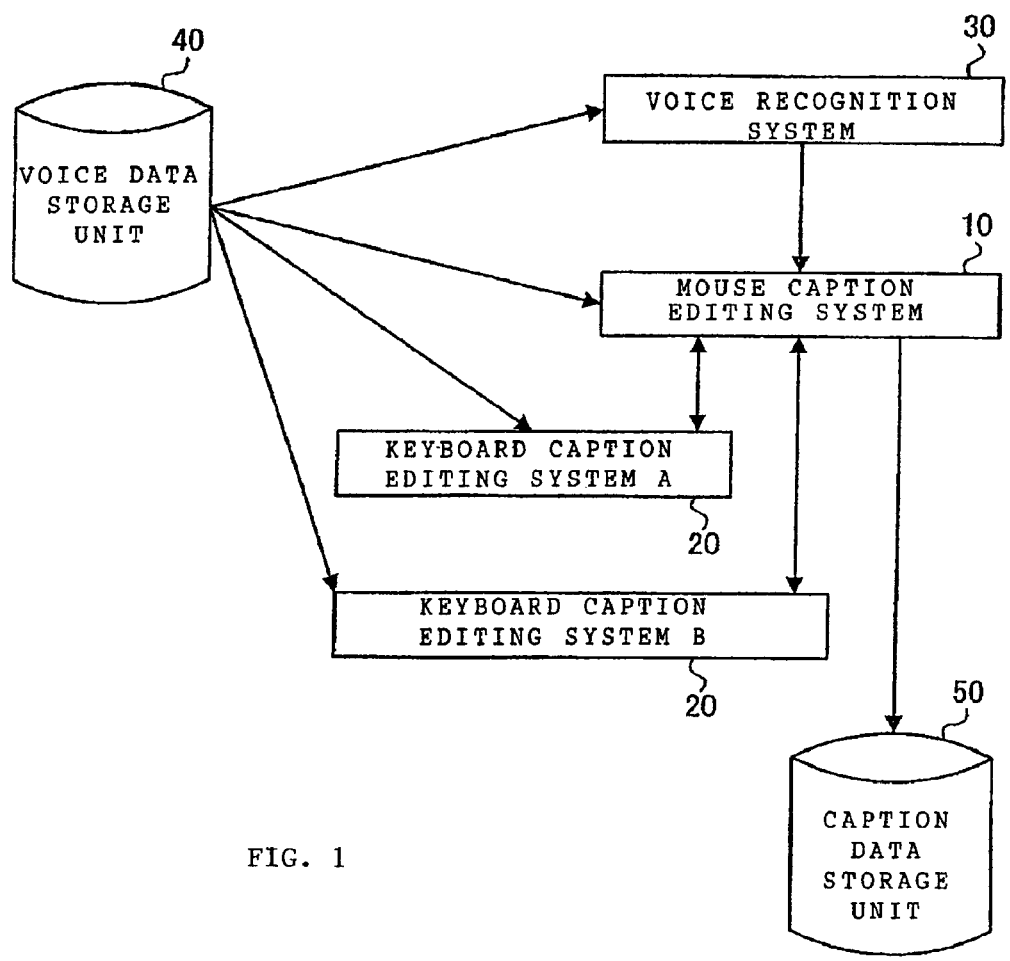
FIG. 1 is a block diagram showing a system configuration according to a first embodiment of the present invention.

FIG. 1 is a block diagram showing a configuration of a caption editing system in this embodiment. This caption editing system includes a mouse caption editing system 10, a keyboard caption editing system 20, a voice recognition system 30, a voice data storage unit 40, and a caption data storage unit 50. Note that FIG. 1 shows the configuration in which two devices, a keyboard caption editing device A and a keyboard caption editing device B, are provided as the keyboard caption editing system 20. However, the keyboard caption editing system 20 is not necessarily consisted of two devices, and may be one device or more than two devices. In addition, although the mouse caption editing system 10 and the keyboard caption editing system 20 are illustrated in FIG. 1 as separate devices, they may be mounted on the same device.

The mouse caption editing system 10 is a system (first computer) which is operated by a person in charge of a created caption (hereinafter, referred to as a "master editor"), and which is realized by a personal computer, for example. The keyboard caption editing system 20 is a system (second computer) which is operated by an operator (hereinafter, referred to as a "keyboard editor") who edits, with a keyboard, a caption received from the mouse caption editing system 10, and which is realized by a personal computer, for example. The voice recognition system 30 is a system which processes voice data by a computer, and, thereby, outputs a content of the voice data in the form of a character string, for example, and which can adopt an existing technology as a voice recognition method. The voice data storage unit 40, which has an area to store voice data of a voice recognition object, is realized by a magnetic disk, an optical disk, a semiconductor memory disk, or the like, for example.

For a voice recognition result which is obtained by the voice recognition system 30, the master editor determines positions of periods/commas, delivers the result to the keyboard caption editing system 20, and makes a final check on and enters an editing result by the keyboard caption editing system 20. Here, determination of the positions of periods/commas is a very important work, since the determination influences work assignment when there are a number of keyboard editors, and a display of a final caption.

Meanwhile, the keyboard editor may only perform a work of inputting a correct character string corresponding to a voice. Since this work is very simple, the keyboard editor can be a relatively low skilled person who is not in a less responsible position. Thus, it is possible to expect an effect that labor costs can be saved.

The contents of specific operations by the master editor are enumerated as follows:

A) If there is no error in a line (hereinafter, referred to as a "caption line"), which is divided by a voice recognition, enter the caption line;

B) Set a degree of certainty for a "roughly correct caption line";

C) Specify periods/commas;

D) Adjust concatenation, division, and the like on caption lines like;

E) Submit a caption line, which needs to be edited, into the keyboard caption editing system 20; and F) Enter a final caption.

Meanwhile, the contents of specific operations by the keyboard editor are enumerated as follows:

A') Edit a caption line, and create a correct caption line; and

B') Enter a correct caption line.

The contents of these operations will be specifically described with reference to FIG. 2. What is shown on the left side in FIG. 2 is a display example on a screen of the mouse caption editing system 10, and on the right side thereof is a display example on a screen of the keyboard caption editing system 20.

Figure 2:
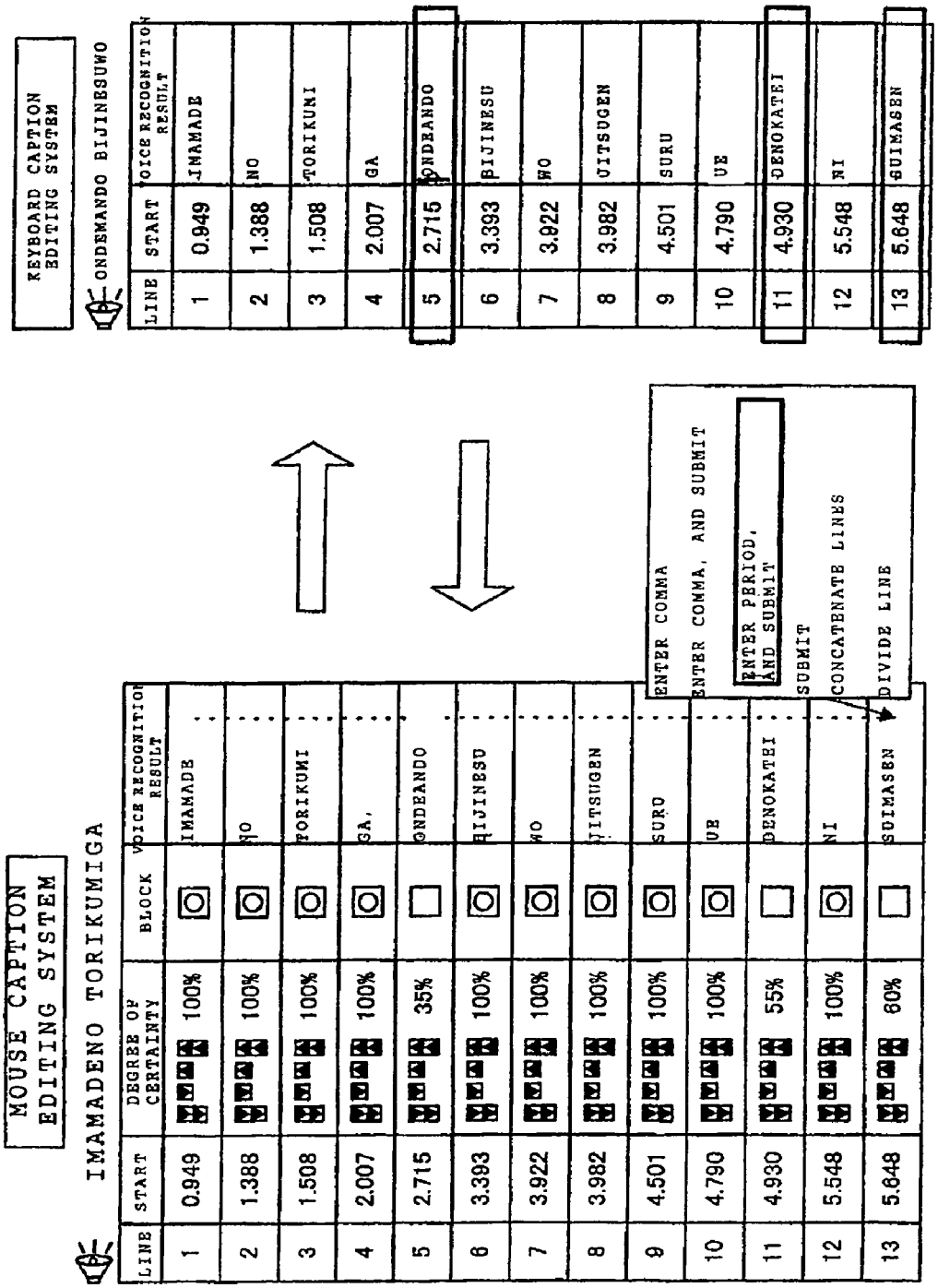
FIG. 2 is a diagram showing a display example in a mouse caption editing system and a keyboard caption editing system according to the embodiment of the present invention.

Here, suppose also, in a similar fashion as in FIG. 23, there is a voice saying "activities until now are part of processes in bringing off an on-demand business deal," and a voice recognition result as shown in FIG. 2 has been obtained.

In the example for a display for the mouse caption editing system 10, the "line" field displays where each caption line is located in row-wise from the head of an entire voice file. The "start" field displays an elapsed time in seconds at which a voice corresponding to each caption line is reproduced, the elapsed time indicating a period of time which has elapsed from the head of the voice file.

The "degree of certainty" field displays a degree of certainty for a voice recognition result for each caption line. The degree of certainty at an initial stage is one which is obtained by the voice recognition system 30 at a stage of a voice recognition process, and which can be changed by the master editor. The voice recognition system 30, normally, does not output a degree of certainty "100%". Therefore, for a degree of certainty indicating "100%" in FIG. 2, it is construed that the master editor has checked a voice recognition result, determined there is no error in the result, and hence set 100% to the degree of certainty. In addition, a change to the degree of certainty can be made using an up arrow and a down arrow in the field.

The "block" field displays a mark on whether or not to block editing a caption line by use of the keyboard caption editing system 20. As described above, once the master editor sets the degree of certainty "100%" in the "degree of certainty" field, the mark "○" is automatically displayed in the "block" field. In this example, it is determined that "on-deand" on line 5, "deno katei" (a Japanese term which does not make sense in the sentence) on line 11, and "suimasen" (a Japanese term which does not make sense in the sentence) on line 13 are lines (hereinafter, referred to as "incorrect lines") which are not correctly recognized. Thus, the mark "○" is not displayed in the "block" field.

The "voice recognition result" field displays a voice recognition result obtained by the voice recognition system 30, in the form of a character string. The master editor determines whether or not this character string is correct.

Meanwhile, the screen of the mouse caption editing system 10, for example, displays a pop-up menu such as one shown in the lower right of the display example. The master editor selects a desired content from those shown in the menu. For instance, as shown in the drawing, suppose the master editor points a focus on a caption line on line 13, and, in this state, selects "ENTER PERIOD AND SUBMIT." In this case, the mouse caption editing system 10 cuts out the caption lines from the first line to the thirteenth line as one sentence to be transmitted to the keyboard caption editing system 20, and information related to the sentence is transmitted to the keyboard caption editing system 20.

Thus, on the screen of the keyboard caption editing system 20, the contents shown on the right side in FIG. 2 are displayed. Subsequently, once editing of the incorrect line is completed using the keyboard caption editing system 20, a confirmation request for an editing result is returned to the mouse caption editing system 10. That is, the arrows between these displayed contents indicate that a part to be edited in the voice recognition result is submitted from the mouse caption editing system 10 to the keyboard caption editing system 20, and that the editing result is submitted to the mouse caption editing system 10.

Note that an example will be given below of the "roughly correct caption line" enumerated in the specific operations B) for the master editor. It is assumed to determine that a subject caption line is a "roughly correct caption line", when it is accepted that the subject caption line conveys a content even though there is a difference in the expressions between a correct caption line and the subject caption line corresponding thereto. For example, assumed is a case such that minutes are created from voices in a meeting.

A. Even if there is an unnecessary period/comma or a missing period/comma in a subject caption line, the subject caption line is determined to be a "roughly correct caption line." For example, for a subject caption line "Daijidesu", a "correct caption line" is "Daijidesu.". However, this subject caption line may be determined to be a "roughly correct caption line" as it is.

B. Even if there is an unnecessary symbol or a missing symbol in a subject caption line, the subject caption line is determined to be a "roughly correct caption line". For example, for a subject caption line "Puro to shitedesune-", a "correct caption line" is "Puro to shitedesune". However, the subject caption line may be determined to be a "roughly correct caption line" as it is.

C. Even if there is an editing error made by an editor in a subject caption line, the subject caption line is determined to be a "roughly correct caption line". For example, for a subject caption line "souita", a "correct caption line" is "souitta". However, the subject caption line may be determined to be a "roughly correct caption line" as it is.

D. Even if there is an error caused by the voice recognition system in a subject caption line, the subject caption line is determined to be a "roughly correct caption line". For example, for a subject caption line "nattemasu", a "correct caption line" is "natteimasu". However, the subject caption line may be determined to be a "roughly correct caption line" as it is.

E. Even if a particle is missing in a subject caption line, the subject caption line is determined to be a "roughly correct caption line". For example, for a subject caption line "be-su natte", a "correct caption line" is "be-su ni natte". However, the subject caption line may be determined to be a "roughly correct caption line" as it is.

F. Even if there are differences in declensional Kana endings between a correct caption line and a subject caption line corresponding thereto, the subject caption line is determined to be a "roughly correct caption line". For example, for a subject caption line "uketsuke" (a Japanese word expressed with declensional Kana endings), when a "correct caption line" is intended to be "uketsuke" (a Japanese word expressed with no declensional Kana endings), the subject caption line may be determined to be a "roughly correct caption line" as it is.

G. Even if there are differences in the kind of Kana writings between a correct caption line and a subject caption line corresponding thereto, the subject caption line is determined to be a "roughly correct caption line". For example, for a subject caption line "motoni" (a Japanese word expressed only in Kana), when a "correct caption line" is intended to be "motoni" (a Japanese word expressed in Kana and Chinese characters), the subject caption line may be determined to be a "roughly correct caption line" as it is.

H. Even if the literations having the same meaning are different in a subject caption line, the subject caption line is determined to be a "roughly correct caption line". For example, for a subject caption line "aidea", when a "correct caption line" is intended to be "aidia", the subject caption line may be determined to be a "roughly correct caption line" as it is.

I. Even if there is a difference in expressions of the characters, either a full-size character or a half-size character, between a correct caption line and a subject caption line corresponding thereto, the subject caption line is determined to be a "roughly correct caption line". For example, for a subject caption line "IBM" (expressed in full-size), when a "correct caption line" is intended to be "IBM" (expressed in half-size), there are times that the subject caption line is determined to be a "roughly correct caption line", with this subject caption line retained as it is.

J. Even if a difference between a correct caption line and a subject caption line corresponding thereto lies in spoken languages, the subject caption line is determined to be a "roughly correct caption line". For example, for a subject caption line "nandesukeredomo", when a "correct caption line" is intended to be "nanodesuga", the subject caption line may be determined to be a "roughly correct caption line" as it is.

Next, the mouse caption editing system 10 and the keyboard caption editing system 20 configuring this embodiment mode will be described in detail below.

Figure 3:
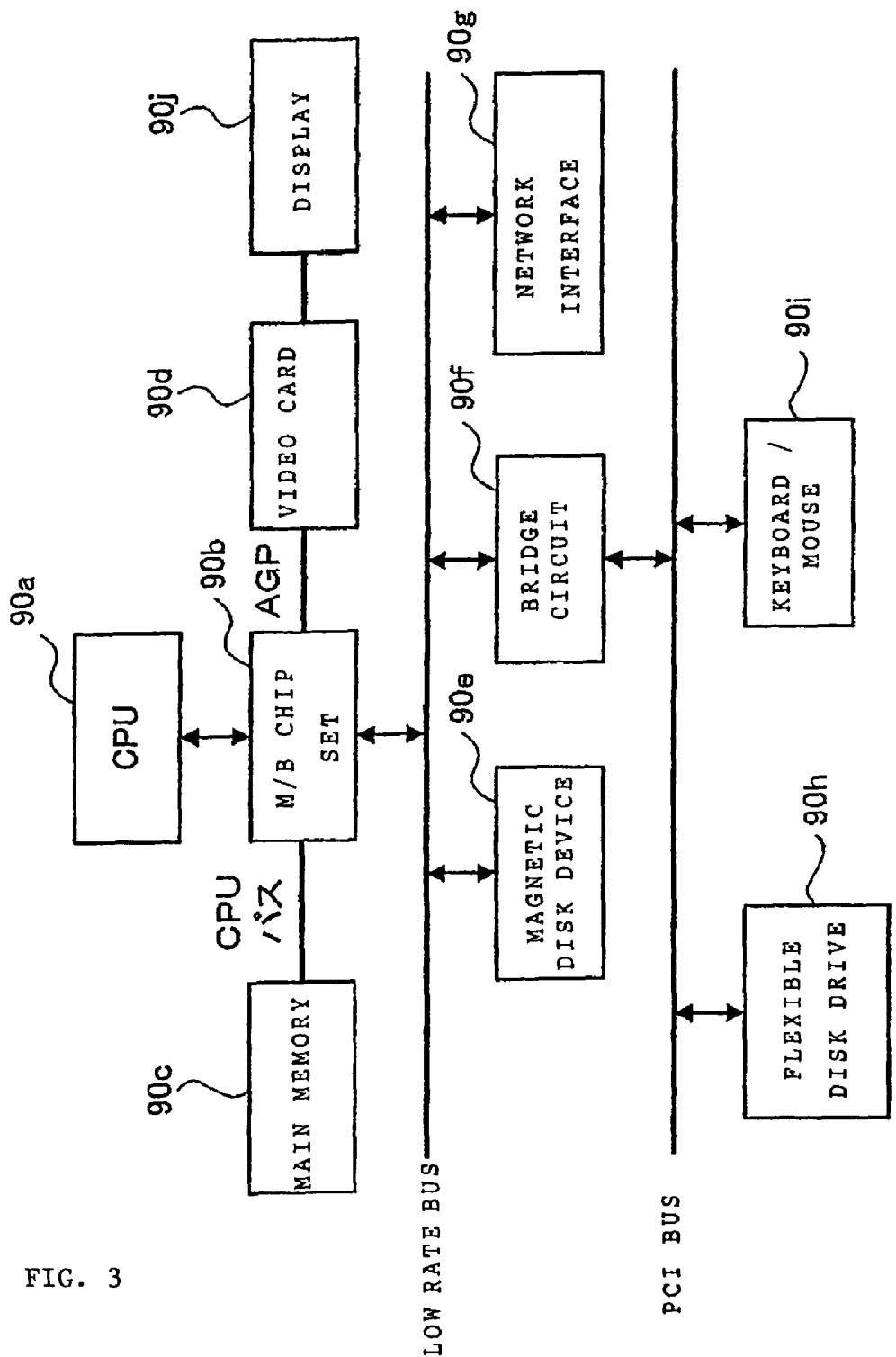
FIG. 3 is a block diagram showing a hardware configuration for the mouse caption editing system and the keyboard caption editing system according to the embodiment of the present invention.

FIG. 3 is a block diagram schematically showing an example of a suitable computer hardware configuration to be used as the mouse caption editing system 10 and the keyboard caption editing system 20 in this embodiment.

The computer shown in FIG. 3 includes a CPU (Central Processing Unit) 90a which is computation means, a main memory 90c which is connected to the CPU 90a through a M/B (motherboard) chip set 90b and a CPU bus, and a video card 90d and a display 90j which are connected to the CPU 90a through the M/B chip set 90b and an AGP (Accelerated Graphics Port). Moreover, the computer includes a magnetic disk device (HDD) 90e which is connected to the M/B chip set 90b through a PCI (Peripheral Component Interconnect), and a network interface 90g. The computer further includes a flexible disk drive 90h and a keyboard/mouse 90i which are connected to the M/B chip set 90b through a bridge circuit 90f and a low-speed bus such as an ISA (Industry Standard Architecture) bus, from the PCI bus.

Note that FIG. 3 exemplifies only a hardware configuration for a computer which realizes this embodiment. Various other configurations can be adopted so long as this embodiment is applicable. For example, a configuration may be adopted in which, instead of providing the video card 90d, only a video memory is mounted, and image data are processed by the CPU 90a. There may also be provided a drive for a CD-R (Compact Disc Recordable) drive or a DVD-RAM (Digital Versatile Disc Random Access Memory) drive through an interface such as an ATA (AT Attachment) and a SCSI (Small Computer System Interface), as an external storage device.

Subsequently, the mouse caption editing system 10 in this embodiment will be described in detail. Note that the description of this mouse caption editing system 10, the mouse caption editing system 10 is referred to as a "master", while the keyboard caption editing system 20 is referred to as a "client", as needed.

Figure 4:
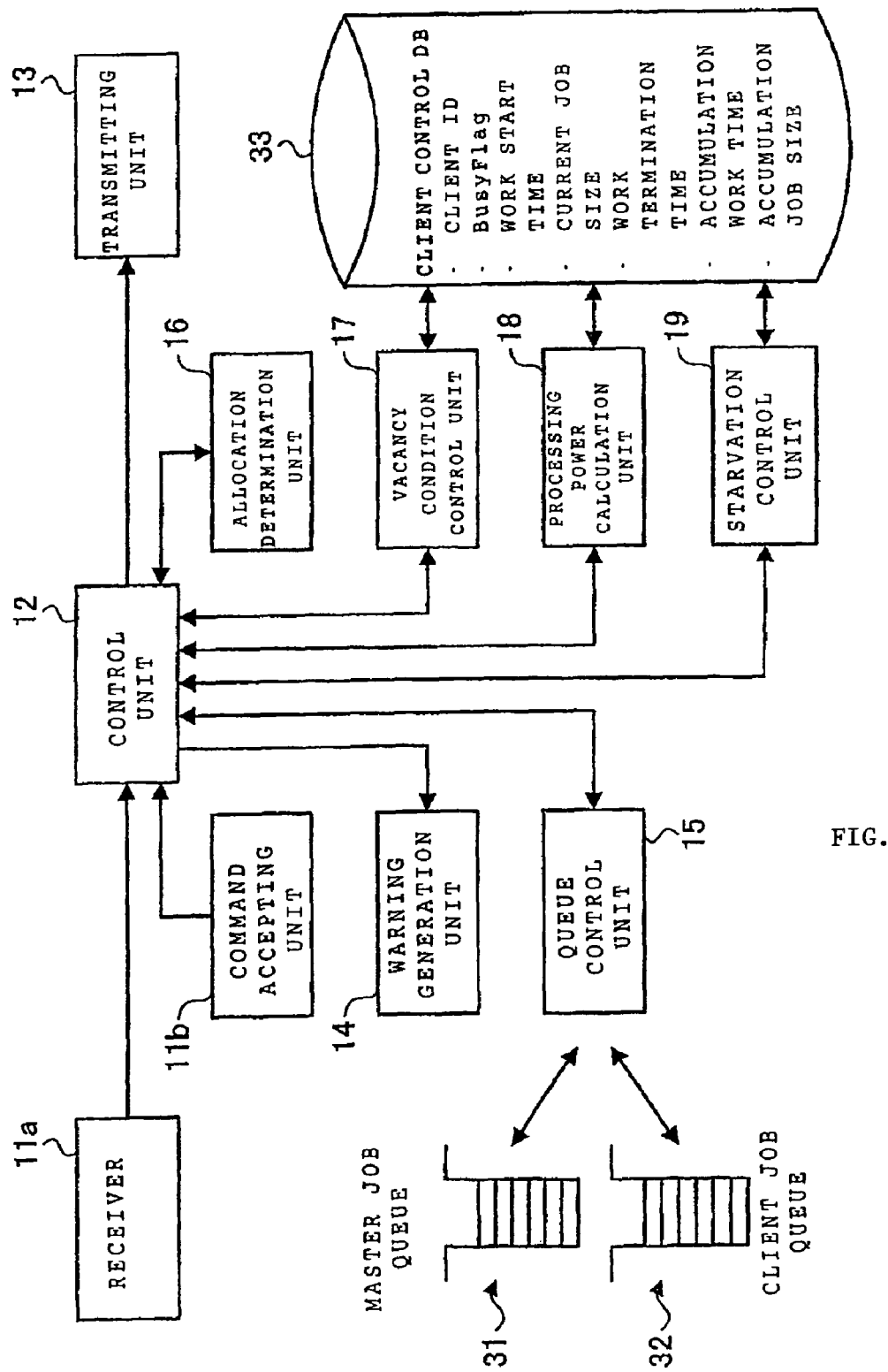
FIG. 4 is a block diagram showing a functional configuration for the mouse caption editing system according to the embodiment of the present invention.

FIG. 4 is a block diagram showing a functional configuration of the mouse caption editing system 10 in this embodiment. This mouse caption editing system 10 includes a receiver 11a, a command accepting unit 11b, a control unit 12, a transmission unit 13, a warning generation unit 14, a queue control unit 15, an allocation determination unit 16, a vacancy condition control unit 17, a processing power calculation unit 18, and a starvation control unit 19. The mouse caption editing system 10 further includes a master job queue 31, a client job queue 32, and a client control database (hereinafter, referred to as a "client control DB") 33. Note that, in FIG. 4, description is omitted for a functional configuration for a master editor to cut out a sentence to be transmitted to the keyboard caption editing system 20.

The receiver 11a includes a function for receiving a job from the keyboard caption editing system 20, while the command accepting unit 11b includes a function for accepting a command which indicates generation of a job to be transmitted to the keyboard caption editing system 20. Moreover, the control unit 12 includes a function for controlling the entire operations of the mouse caption editing system 10, while the transmission unit 13 includes a function for transmitting a job to the keyboard caption editing system 20.

The warning generation unit 14 includes a function for generating a warning, when jobs, which should be processed by the keyboard caption editing system 20, begins to accumulate without being processed or when the keyboard caption editing systems 20, which are not performing operations, begin to increase. The queue control unit 15 includes a function for putting job into or taking the jobs out of the master job queue 31 and the client job queue 32, and for controlling the jobs stored in these queues.

The allocation determination unit 16 includes a function for determining allocation of jobs to the keyboard caption editing system 20, and the vacancy condition control unit 17 has a function for referring to/updating information with respect to a vacancy condition in the client control DB 33. Moreover, the processing power calculation unit 18 includes a function for referring to/updating information with respect to processing power of a keyboard editor in the client control DB 33. The starvation control unit 19 includes a function for referring to/updating information with respect to a work condition of a client in the client control DB 33.

The master job queue 31 is a queue for storing a job which has been transmitted from the keyboard caption editing system 20 to the mouse caption editing system 10. The client job queue 32 is a queue for storing a job which is transmitted from the mouse caption editing system 10 to the keyboard caption editing system 20. Note that it is assumed that a job ID which uniquely identifies a job, a processed flag which indicates whether or not a process for a job has been completed, the job itself have been associated with one another, and stored in the client job queue 32. Even if a job has been processed, not all information is subject to elimination, and "Processed" is written in the processed flag.

Moreover, as shown in the drawing, in the client control DB 33, there are controlled a client ID, a BusyFlag, a work start time, a current job size, a work termination time, an accumulation work time, and an accumulation job size.

Here, the client ID is an ID for uniquely identifying each keyboard caption editing system 20. The BusyFlag is a flag which indicates whether or not each keyboard caption editing system 20 is working. The flag indicates "Busy" for a state where each keyboard caption editing system 20 is working, while the flag indicates "NotBusy" for a state where each keyboard caption editing system 20 is not working. The work start time indicates a time at which each keyboard caption editing system 20 starts working on a current job, and is a piece of information which is effective only when the BusyFlag is "Busy". The current job size indicates a data size of a job which is currently being processed, and is a piece of information which is effective only when the BusyFlag is "Busy". The work termination time indicates a time when the last job received from each keyboard caption editing system 20, and is a piece of information which is effective only when the BusyFlag is "NotBusy". Furthermore, the accumulation work time indicates an accumulated amount work time in each keyboard caption editing system 20. The accumulation job size indicates accumulation of jobs processed by each keyboard caption editing system 20.

Note that each of these functional parts is achieved through cooperation of software and hardware resources. To be more specific, the CPU of the mouse caption editing system 10 reads a program from an external storage device into a main storage device, the program achieving the receiver 11a, the command accepting unit 11b, the control unit 12, the transmission unit 13, the warning generation unit 14, the queue control unit 15, the allocation determination unit 16, the vacancy condition control unit 17, the processing power calculation unit 18, and the starvation control unit 19. The CPU of the mouse caption editing system 10 then performs processing while referring to the master job queue 31, the client job queue 32, and the client control DB 33, as external storage devices, when necessary.

Meanwhile, in this embodiment, the keyboard caption editing system 20 is operated by the various types of labors such as students, volunteers, and the physically-challenged. That is, the skill levels of keyboard editors vary widely. It is, however, difficult to accurately predict in advance processing power of each keyboard editor. In addition, the processing power varies dynamically. Furthermore, a job, which is transmitted to the keyboard caption editing system 20, is irregularly generated, its size varies, and it is not possible to predict the termination of the job. Meanwhile, it is not preferable that a situation (so-called starvation) occurs, in which a keyboard editor with a low skill level will indefinitely never have a turn for carrying out a job. Therefore, in this embodiment, there is adopted a method for delivering a job, which maximizes a throughput, without causing starvation or dead-lock.

Here, the prerequisites for this embodiment will be summarized.

1) There must be a single mouse caption editing system 10, and a master editor who operates the mouse caption editing system 10.

2) There must be more than one keyboard caption editing system 20, and keyboard editors corresponding thereto.

3) A master editor is a person in charge of a product, and his/her skill level is at a secure level. Here, a work for the master editor is to check a correct part while checking a voice recognition result, transmit an incorrect part to the keyboard caption editing system 20 at an appropriate point of time, and instruct correction of the incorrect part. Furthermore, the work for the master editor also involves a final check of a job which is returned after processing by the keyboard caption editing system 20 is completed.

4) Keyboard editors are in a position to follow the master editor's instruction, and their skill levels are supposed to vary widely. The reason why their skill levels vary widely is that the various types of labors are assumed to be work forces, while their backgrounds are different from one another in terms of handicap, age, experience, and the like.

5) As the keyboard editor, there is a possibility that there is a person whose processing power does not greatly change even after a certain time lapses. Meanwhile, it is also assumed that, as seen in young people, there is a person whose processing power greatly improves as he/she is "accustomed to" his/her work, while, on the other hand, for a person such as an aged one whose processing power decreases as he/she is "exhausted".

6) Each job is independent of a keyboard editor. For example, there must not be a keyboard editor dependency such that a job 1 can not be processed unless the job is done by anyone but a keyboard editor A.

7) Generation of a job is irregular, and its size varies widely. A cause of the size variation lies in that two parts where the respective rates of recognition in voice recognition are high and low are mixed. In general, in the rate of recognition in voice recognition, because of one of or both of an acoustic model and a speech model, there are also parts where the rates of recognition are high and low in speeches under the same circumstance. For this reason, even if the master delivers a job within a specific range such as a constant period of time and a constant size, job sizes (in caption edition for a part in incorrect recognition) within the specific range do not become uniform as shown in FIGS. 5(a) and 5(b).

8) It is also impossible to predict the termination of a job. For example, even if a length of contents on which a caption is desired to be appended is 6o minutes, it is not necessarily the case that the entire 60-minute contents are captioned all at once. For example, the following is also possible. Specifically, first, 15-minute contents are once captioned, and thereafter, checks are made for working methods such as description of technical terms and description of numerals. Subsequently, captioning of the rest of the contents is resumed.

First, description will be given of a method for calculating processing power of a keyboard editor. A job is transmitted from the mouse caption editing system 10 to the keyboard caption editing system, and after the job is processed by the keyboard caption editing system 20, the job is transmitted to the mouse caption editing system 10. A period of time required from the time at which the mouse caption editing system 10 transmits the job until the time at which the mouse caption editing system 10 receives the job can be easily calculated. The processing power of each keyboard editor can be obtained by dividing an actual job size of this job by the period of time required. It becomes possible to dynamically calculate the processing power of each keyboard editor by accumulating the actual job size and the processing time, as needed. Note that, for the actual job size of the job, for example, it is possible to adopt any information expressing a load as a job, such as the number of lines for a caption line which a master editor has determined as an error, the total number of characters contained in the caption line, and the like.

Furthermore, even if a keyboard editor can quickly process, he/she cannot be said to have high processing power when he/she makes a lot of mistakes. Thus, a degree of accuracy on a job can be figured out by obtaining an amount of data corrected by the master editor when the master editor makes a final check on an editing result by a keyboard editor. Hence, the processing power can also be updated based on the performance accumulated with respect to the accuracy of the job done by each keyboard editor.

Moreover, at an initial stage, information which is used to calculate processing power of each keyboard editor is not ready. Hence, in such a case, an initial value for the processing power may be calculated in advance according to certain criteria based on age and the like.

In addition, such information as to the processing power is only calculated internally, but not externally presented. Accordingly, an existing technology makes it possible not to store a value of the processing power in consideration of privacy, and to automatically destroy the processing power when the system is terminated. Meanwhile, if it is necessary to store the processing power of a particular keyboard editor as a special case (upon protecting his/her privacy) for the free time system, for example, the task described above can also be easily achieved by the existing technology.

Next, description will be given of operations by the mouse caption editing system 10 in this embodiment.

Figure 6:
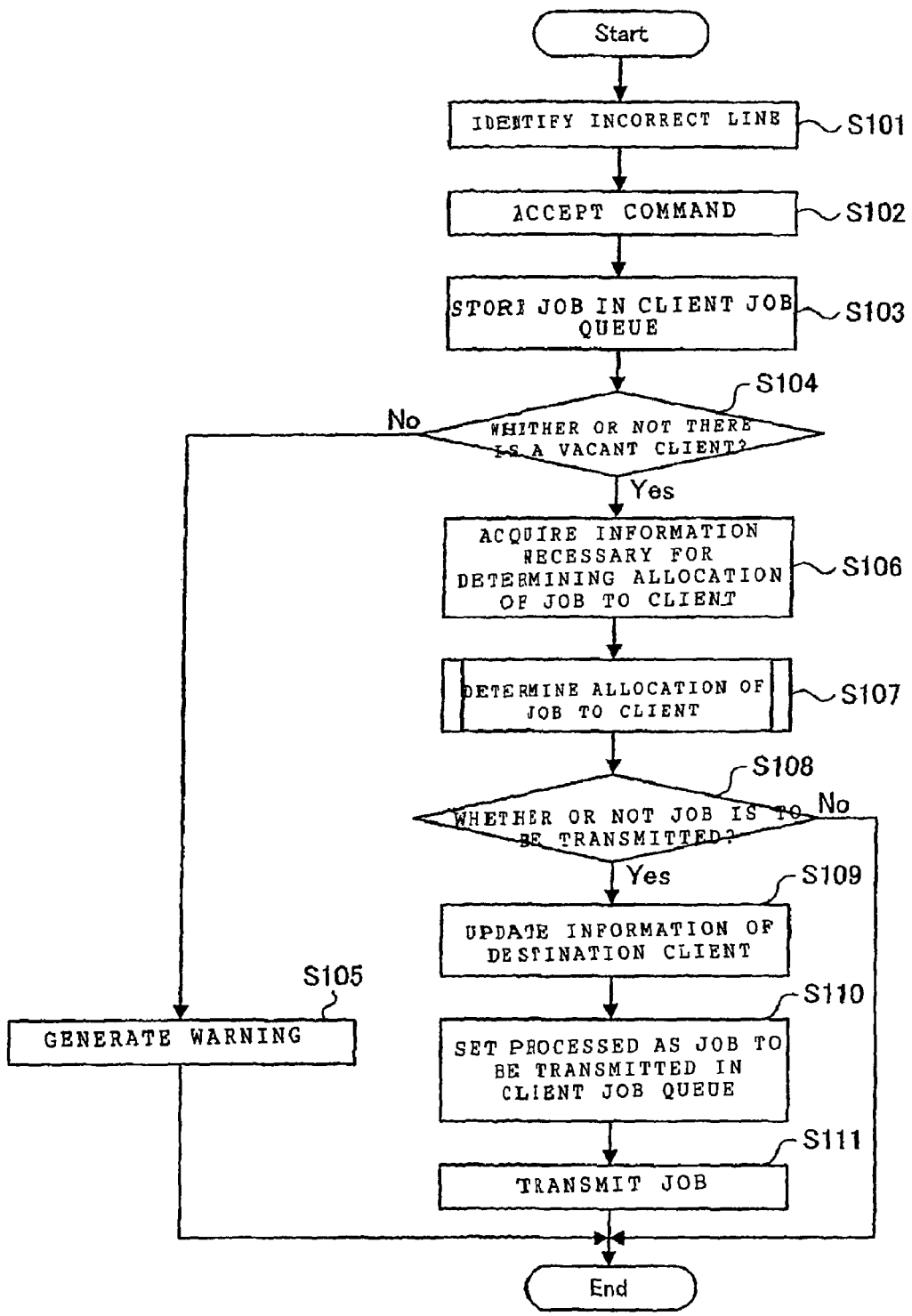
FIG. 6 is a flowchart showing operations by the mouse caption editing system according to the embodiment of the present invention.

FIG. 6 is a flowchart showing operations by the mouse caption editing system 10 when a job is generated by operations performed by a master editor.

First, the master editor instructs the mouse caption editing system 10 to reproduce a voice in a state where voice recognition as shown in FIG. 2 is displayed. The master editor, then, checks a degree of certainty on a screen while comparing the voice with the displayed voice recognition result. Here, the checking on the degree of certainty is a work of classifying each caption line into a correct caption line, an incorrect caption line, or a caption line to be displayed with uncertainty. To be more specific, for the correct caption line, the degree of certainty is set as "100%", while the degree of certainty is retained as it is for the incorrect caption line. Meanwhile, for the caption line to be displayed with uncertainty, the degree of certainty is retained as it is, or may be changed.

Thereafter, when the master editor determines that a sentence ends, he/she stops the voice, and instructs the keyboard caption editing system 20 to submit. Thus, the mouse caption editing system 10 identifies an incorrect line out of the caption lines included in the voice recognition result (Step 101).

Note that, in this manner, an editing work on a sentence which is cut out by the master editor is generated as a job. This job contains information necessary for achieving display of the keyboard caption editing system 20 shown in FIG. 2. In addition, the job also contains information for identify an incorrect caption line, although the information is not shown on the display of the keyboard caption editing system 20.

Next, in the mouse caption editing system 10, the command accepting unit 11b accepts a command that a job is generated (Step 102).

Thus, when a control is passed to the control unit 12, the control unit 12 instructs the queue control unit 15 to store a job to be submitted, in the client job queue 32. According to this instruction, the queue control unit 15 stores the job in the client job queue 32 (Step 103).

Moreover, the control unit 12 instructs the vacancy condition control unit 17 to determine whether or not there exists a client which is not currently processing a job (hereinafter, referred to as a "vacant client"). According to the instruction, the vacancy condition control unit 17 refers to the BusyFlag of every client which is controlled by the client control DB 33, and determines whether or not there exists a vacant client (Step 104). The vacancy condition control unit 17 returns to the control unit 12, when there is no vacant client, a notification that there is no vacant client, and returns thereto, when there is a vacant client, the ID of the vacant client.

As a result, when the notification that there is no vacant client is returned, the control unit 12 instructs the warning generation unit 14 to generate a warning. According to this instruction, the warning generation unit 14 displays the warning on the screen of the mouse caption editing system 10 (Step 105). Note that the warning generation unit 14 may change the intensity of warning according to the number of unprocessed jobs stored in the client job queue 32. For example, the warning generation unit 14 may generate a weak warning when the number of unprocessed jobs is one, and may generate a strong warning when the number of unprocessed jobs is more than one. Moreover, there may be considered a method for simply quantifying and displaying a warning. There may also be considered a method for displaying the number of unprocessed jobs depending on the intensity, tone, or pitch of a sound and the like.

Meanwhile, when the ID of the vacant client is returned, the control unit 12 instructs the queue control unit 15, the processing power calculation unit 18, and the starvation control unit 19 to collect information necessary for processing in the allocation determination unit 16. According to the instruction, the queue control unit 15, the processing power calculation unit 18, and the starvation control unit 19 collect such information (Step 106).

To be more precise, the queue control unit 15 acquires the job size and the processed flag of every job stored in the client job queue 32. Then, the queue control unit 15 returns the job sizes and the processed flags to the control unit 12.

In addition, the processing power calculation unit 18 refers to the client control DB 33, and calculates the processing power of each client. To be more precise, the processing power calculation unit 18 divides an accumulated job size, which is controlled by the client control DB 33, by an accumulated amount of work time so as to obtain an amount of work which each operator can carry out per unit. Subsequently, the processing power calculation unit 18 returns the processing power of each client to the control unit 12.

Furthermore, the starvation control unit 19 subtracts a work termination time, which is controlled by the client control DB 33, from a current time, and acquires a latency of a vacant client. Then, the starvation control unit 19 returns the latency to the control unit 12.

In this way, the control unit 12 retains information concerning the processing power of every client, the size and the processed flag of every job, the ID of the vacant client, the ID of the current job, and the latency of the vacant client. Then, the control unit 12 instructs the allocation determination unit 16 to determine allocation of jobs to clients. According to this instruction, the allocation determination unit 16 determines allocation of jobs to clients (Step 107). Subsequently, the allocation determination unit 16 returns a result of the allocation (transmission of a job may be temporarily suspended) to the control unit 12. Note that this determination processing will be described in detail later. The control unit 12 determines whether or not it is necessary to transmit a job to a client, based on the information returned from the allocation determination unit 16(Step 108).

As a result, when it is determined that the job needs be transmitted, the control unit 12 instructs the vacancy condition control unit 17, the processing power calculation unit 18, and the starvation control unit 19 to update information of a destination client, which is controlled by the client control DB 33. According to this instruction, the vacancy condition control unit 17, the processing power calculation unit 18, and the starvation control unit 19 update the information of the destination client (Step 109). To be more precise, the starvation control unit 17 sets a BusyFlag of the destination client to Busy. Moreover, the processing power calculation unit 18 sets the size of the job to be transmitted, to a current job size. The starvation control unit 19 sets the current time to the work start time.

Furthermore, once updating of the information in the client control DB 33 is completed, the queue control unit 15 sets "Processed" (Step 110) to a processed flag for this job stored in the client job queue 32, according to an instruction by the control unit 12. Subsequently, this job is passed to the transmission unit 13, and the transmission unit 13 transmits the job to the destination client (Step 111).

Meanwhile, when it is determined that the job needs not be transmitted, the process is terminated as it is.

The job thus transmitted is processed by the client, and, as a response thereto, a job which requests a confirmation by the master is transmitted.

Figure 7:
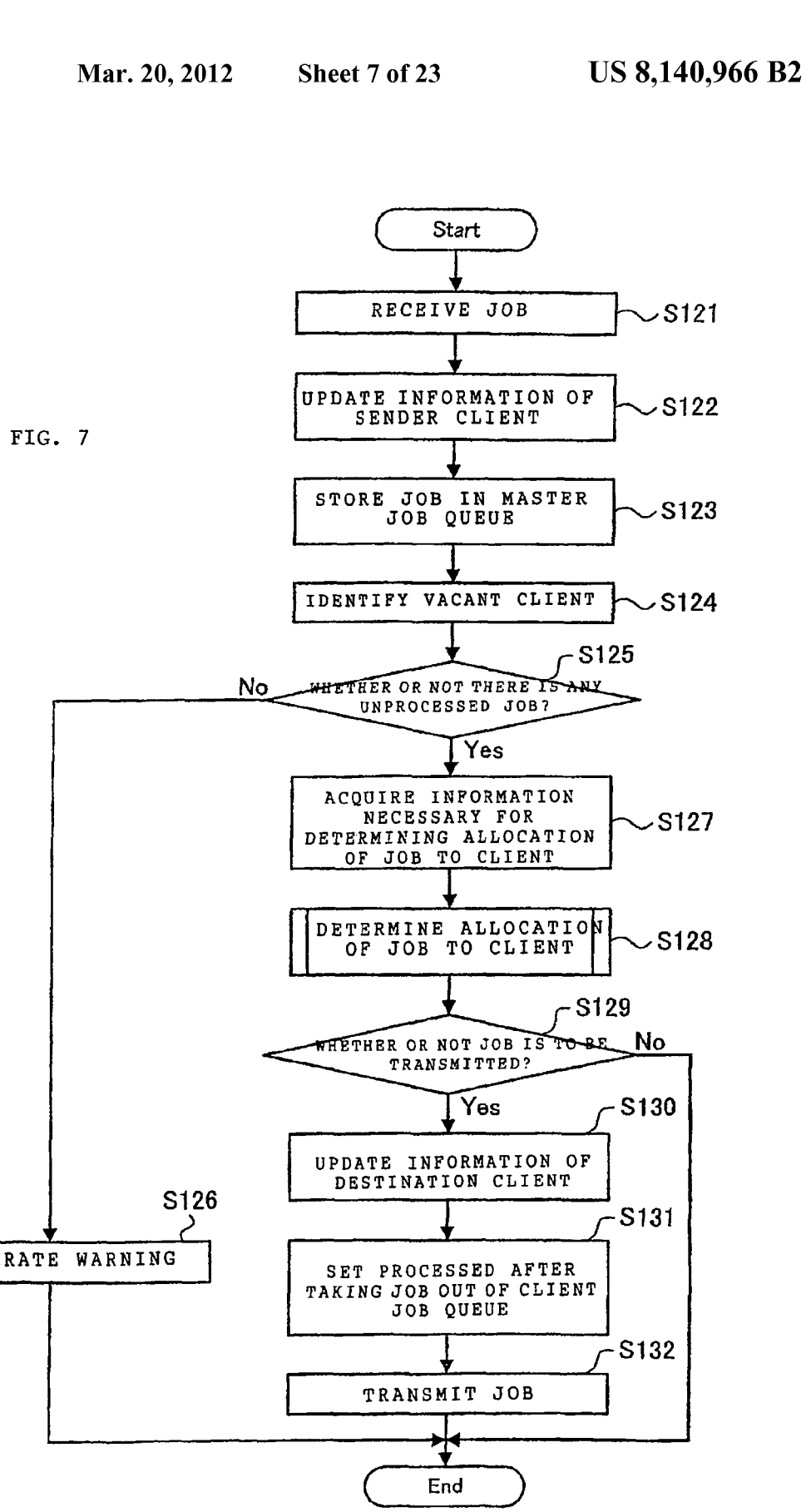
FIG. 7 is another flowchart showing operations of the mouse caption editing system according to the first embodiment of the present invention.

FIG. 7 is a flowchart showing operations of the mouse caption editing system 10 when receiving such a job.

First, the receiver 11a receives a job from a client (Step 121).

A control is, thus, passed to the control unit 12, and the control unit 12 instructs the vacancy condition control unit 17, the processing power calculation unit 18, and the starvation control unit 19 to update information of a destination client, which is controlled by the client control DB 33. According to this instruction, the vacancy condition control unit 17, the processing power calculation unit 18, and the starvation control unit 19 update the information of the destination client (Step 122). To be more precise, the starvation control unit 17 sets a BusyFlag of the destination client to NotBusy. Moreover, the processing power calculation unit 18 adds the time obtained by subtracting the work start time from the current time, to an accumulated work time, and adds the current job size to the accumulated job size. Then, the starvation control unit 19 sets the current time to the work termination time.

Next, the control unit 12 instructs the queue control unit 15 to store the received job in the master job queue 31. According to this instruction, the queue control unit 15 stores the job in the master job queue 31 (Step 123).

Moreover, the control unit 12 instructs the vacancy condition control unit 17 to identify a vacant client. According to this instruction, the vacancy condition control unit 17 refers to the BusyFlag of every client which is controlled by the client control DB 33, and identifies the vacant client (Step 124). To be more precise, since NotBusy has been set in Step 122 for the client which is a destination for the current job, the client is definitely identified as the vacant client. However, if there is another vacant client, the vacant client is also identified along therewith. Subsequently, the vacancy condition control unit 17 returns the ID's of the vacant clients to the control unit 12.

Next, the control unit 12 instructs the queue control unit 15 to determine whether or not an unprocessed job is stored in the client job queue 32. According to this instruction, the queue control unit 15 determines whether or not the unprocessed job is stored therein (Step 125). The queue control unit 15 returns to the control unit 12, when there is no unprocessed job, a notification that there is no unprocessed job, and returns thereto, when there is an unprocessed job, the ID of the unprocessed job.

As a result of the above described, when it is determined that there is no unprocessed job, the control unit 12 instructs the warning generation unit 14 to generate a warning. According to the instruction, the warning generation unit 14 displays the warning on the screen of the mouse caption editing system 10 (Step 126). Note that the warning generation unit 14 may change the intensity of warning according to the number of vacant clients. For example, the warning generation unit 14 may generate a weak warning when the number of vacant clients is one, and may generate a strong warning when the number of vacant clients is more than one. Moreover, there may be considered a method for simply quantifying and displaying a warning. There may also be considered a method for displaying the number of unprocessed jobs depending on the intensity, tone, or pitch of a sound and the like.

Meanwhile, when it is determined that there is an unprocessed job, the control unit 12 instructs the queue control unit 15, the processing power calculation unit 18, and the starvation control unit 19 to collect information necessary for processing in the allocation determination unit 16. According to the instruction, the queue control unit 15, the processing power calculation unit 18, and the starvation control unit 19 collect such information (Step 127).

To be more precise, the queue control unit 15 acquires the job size and the processed flag of every job stored in the client job queue 32. Then, the queue control unit 15 returns the job sizes and the processed flags to the control unit 12.

In addition, the processing power calculation unit 18 refers to the client control DB 33, and calculates the processing power of each client. To be more precise, the processing power calculation unit 18 divides an accumulated job size, which is controlled by the client control DB 33, by an accumulated amount of work time so as to obtain an amount of work which each operator can carry out per unit. Subsequently, the processing power calculation unit 18 returns the processing power of each client to the control unit 12.

Furthermore, the starvation control unit 19 subtracts a work termination time, which is controlled by the client control DB 33, from a current time, and acquires a latency of a vacant client. Then, the starvation control unit 19 returns the latency to the control unit 12.

In this way, the control unit 12 retains information concerning the processing power of every client, the size and the processed flag of every job, the ID of the vacant client, the ID of the current job, and the latency of the vacant client. Then, the control unit 12 instructs the allocation determination unit 16 to determine allocation of jobs to clients. According to this instruction, the allocation determination unit 16 determines allocation of jobs to clients (Step 128). Subsequently, the allocation determination unit 16 returns a result of the allocation (transmission of a job may be temporarily suspended) to the control unit 12. Note that this determination processing will be described in detail later. The control unit 12 determines whether or not it is necessary to transmit a job to a client, based on the information returned from the allocation determination unit 16(Step 129).

As a result, when it is determined that the job needs to be transmitted, the control unit 12 instructs the vacancy condition control unit 17, the processing power calculation unit 18, and the starvation control unit 19 to update information of a destination client, which is controlled by the client control DB 33. According to this instruction, the vacancy condition control unit 17, the processing power calculation unit 18, and the starvation control unit 19 update the information of the destination client (Step 130). To be more precise, the vacancy condition control unit 17 sets a BusyFlag of the destination client to Busy. Moreover, the processing power calculation unit 18 sets the size of the job to be transmitted, to a current job size. The starvation control unit 19 sets the current time to the work start time.

Furthermore, once updating of the information in the client control DB 33 is completed, according to an instruction by the control unit 12, the queue control unit 15 takes out a job to be transmitted, from the client job queue 32, and sets "Processed" to a processed flag for this job (Step 131). Subsequently, the job is passed to the transmission unit 13, and the transmission unit 13 transmits the job to the destination client (Step 132).

Meanwhile, when it is determined that the job needs not be transmitted, the processing is terminated as it is.

Next, processing contents of the allocation determination unit 16 will be described in detail with reference to FIG. 8.

The allocation determination unit 16 determines whether the number of vacant clients is one or more than one (Step 141), and determines, at the same time, whether the number of unprocessed jobs is one or more than one (Step 142). Processes are allocated based on a result thus obtained. That is, when the number of vacant clients is one and the number of unprocessed jobs is more than one, an optimum job selection process is performed; when the number of vacant clients is one and the number of unprocessed jobs is one, a delay process is performed; and, when the number of vacant clients is more than one and the number of unprocessed jobs is one, an optimum client selection process is performed. Note that, because there does not occur the case where the number of vacant clients is more than one and the number of unprocessed jobs is also more than one, as long as processing is performed according to any of the flowcharts in FIGS. 6 and 7, such a case is not considered.

First, the optimum job selection process will be described. The optimum job selection process is to select an optimum job to be transmitted to the vacant client when there is a plurality of unprocessed jobs in the client job queue 32, and the number of vacant clients is one.

Figure 9:
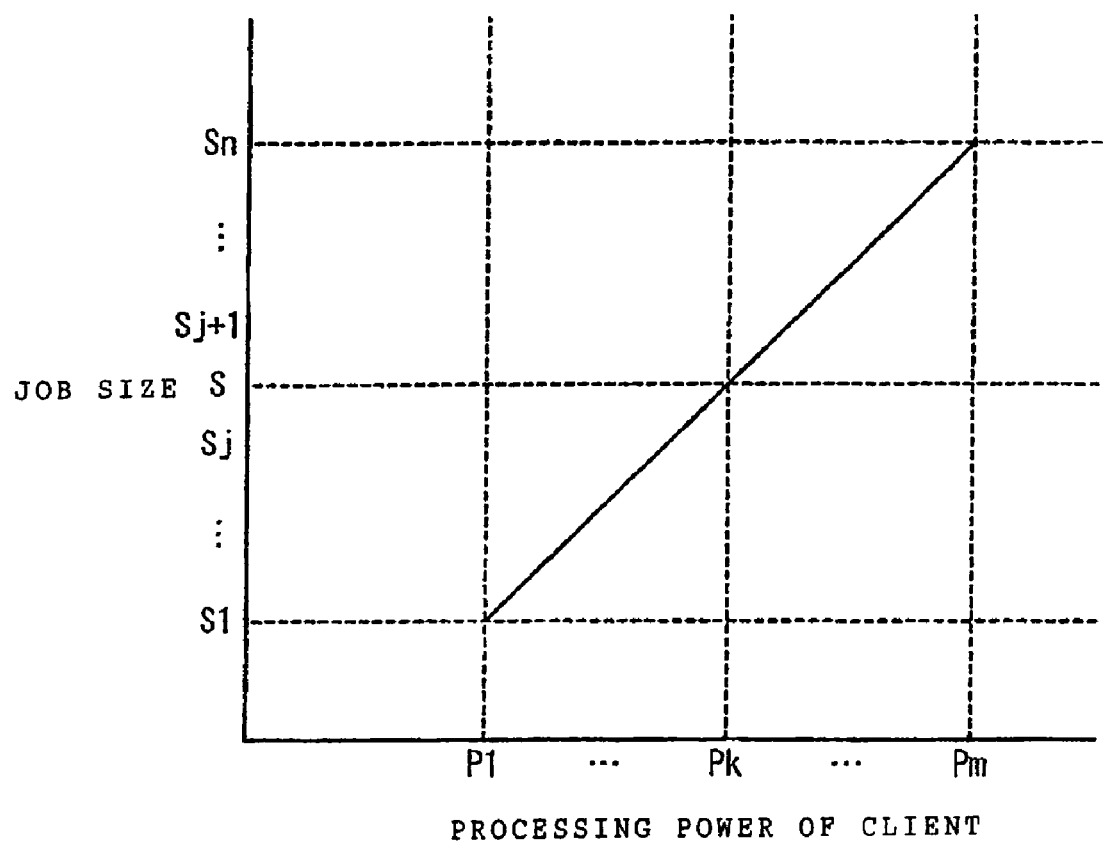
FIG. 9 is a diagram for explaining an optimum job selection process according to the embodiment of the present invention.

In the optimum job selection process, first, the allocation determination unit 16 performs mapping as shown in FIG. 9. That is, the processing power $P_i$ (i=1 to m) of every client is set on the X-axis, the processing power acquired prior to processing to be performed by the allocation determination unit 16, while the job size $S_j$ (j=1 to n) of every job is set on the Y-axis. Next, the point where the minimum value $P_1$ of the processing power is assigned an X-coordinate and the minimum value $S_1$ of the job size is assigned a Y-coordinate, is joined using a solid line, with the point where the maximum value $P_m$ of the processing power is assigned an X-coordinate and the maximum value $S_n$ of the job size is assigned a Y-coordinate. A Y-coordinate S is obtained, corresponding to a point on the same solid line at which the processing power $P_k$ of the vacant client $C_k$ is assigned an X-coordinate (Step 143). In this embodiment, this S is assumed to be an ideal job size to be transmitted to a vacant client, and a job whose size is closest to the value S is obtained among unprocessed jobs (Step 144). The allocation determination unit 16 determines allocation of transmitting the job to a vacant client, and returns the ID of the job to the control unit 12(Step 145).

Here, an effect achieved by adopting the optimum job selection process will be described.

FIG. 10(a) is a time chart in the case where a job is sequentially processed according to FIFO (First-In First-out), and FIG. 10(b) is a time chart in the case where the optimum job selection process is adopted. Note that inside the brackets on the left side of each chart indicates processing power of a keyboard editor who operates each client.

In FIG. 10(a), the jobs 1, 2, and 3 are allocated respectively to the clients C, B, and A in this order. Meanwhile, since there are no vacant clients when the jobs 4 and 5 are generated, the jobs are caused to wait without being processed. Subsequently, since the clients A and C become vacant in this order, the jobs 4 and 5 are allocated respectively to the clients A and C. However, in FIG. 10(a), the job 5 is depicted as one which requires a relatively long period of time if processed by the client C. Hence, a throughput as a whole is lowered.

In contrast, as shown in FIG. 10(b), when the optimum job selection process is adopted, a job which is appropriate to the processing power of each client is requested. Thus, lowering of the throughput is avoided.

Next, the delay process will be described. The delay process is to determine, when there is one unprocessed job in the client job queue 32 and the number of vacant clients is one, whether the job should be immediately delivered to the vacant client or the job should be held (should be delayed) without being delivered.

In the delay process, first, the allocation determination unit 16 performs mapping as shown in FIG. 11(a). That is, in the case of the optimum job selection process, a job size S, which is ideal to the processing power $P_k$ of the vacant client $C_k$, is obtained (Step 146).

Next, the allocation determination unit 16 obtains an optimum job size degree Dk for an unprocessed job (Step 147). Here, the optimum job size degree Dk is defined as "Dk=1/|S−Sj|" by using the unprocessed job size Sj and the ideal job size S. Meanwhile, |S−Sj| represents a distance between S and Sj, and Dk is assumed to be Max when S=Sj.

Moreover, the allocation determination unit 16 obtains a latency weight Wk based on a latency of the vacant client Ck which has been acquired prior to processing by the allocation determination unit 16 (Step 148). Note that the latency is not used as it is, but is used after being converted into a latency weight.

For example, when comparing a 2-second latency and a 4-second latency, the latter is simply twice the former. Meanwhile, even when comparing a 20-minute latency and a 40-minute latency, just the same as the above case, the latter is twice the former. However, in the human intuition, one feels a great difference in the second example rather than in the first example. Therefore, in this embodiment, the latency is not used as it is, but is used by being converted into a latency weight which has no linear correspondence with the latency. As a method, for example, when a latency weight is acquired by converting the latency using a linear function, a slope where the latency is greater than a boundary value is set greater than a slope where the latency is lower than the boundary value. There are various methods for deriving a latency weight using a latency by combining known functions such as a linear function and a quadratic function.

FIG. 11(*b*) is a diagram showing the latency and the latency weight, which are thus obtained. In the delay process, since the number of vacant clients is one, only the latency weight Wk for the client Ck is illustrated in the drawing.

Next, the allocation determination unit 16 obtains a job optimum degree Fk (Step 149). Note that the job optimum degree Fk can be figured out by use of "Fk=Wk×Dk" using the latency weight Wk and the optimum job size degree Dk.

Incidentally, the allocation determination unit 16 determines whether or not the job optimum degree has exceeded a predetermined threshold $F_{TH}$ (Step 150). FIG. 11(*c*) shows a comparison between the threshold $F_{TH}$ and the job optimum degree Fk thus acquired.

As a result, when it is determined that the job optimum degree Fk has exceeded the threshold $F_{TH}$, an ID of the job is returned to the control unit 12 (Step 151). Meanwhile, when it is determined that the job optimum degree Fk has not exceeded the threshold $F_{TH}$, the delay process is performed to return "Will Not Transmit" to the control unit 12 (Step 152).

Note that it is assumed that, when Dk=Max, the job optimum degree Fk reaches a value exceeding the threshold $F_{TH}$ irrespective of the latency and the latency weight.

Here, effects achieved by adopting the delay process will be described.

FIG. 12(*a*) is a time chart in the case where a job is sequentially processed according to FIFO, and FIG. 12(*b*) is a time chart in the case where the delay process is adopted. Note that inside the brackets on the left side of each chart indicates processing power of a keyboard editor who operates each client.

In FIG. 12(*a*), the jobs 1, 2, and 3 are allocated respectively to the clients C, B, and A in this order. Meanwhile, since there is no vacant client when the job 4 is generated, the job is caused to wait without being processed. Subsequently, since the client C becomes vacant, the job 4 is immediately allocated to the client C. However, in FIG. 12(*a*), the job 4 is depicted as one which requires a relatively long period of time if processed by the client C. Hence, a throughput as a whole is lowered.

In contrast, as shown in FIG. 12(*b*), when the delay process is adopted, the job 4 in not processed by the client C, but the job 5 generated after the job 4 is processed by the client C, the job 5 being appropriate to the processing power of the client C. Thus, lowering of the throughput is avoided.

Next, the optimum client selection process will be described. The optimum client selection process is to acquire an optimum client when there is a plurality of vacant clients for a single job.

First, the allocation determination unit 16 performs mapping as shown in FIG. 13(*a*). That is, the processing power of every client is set on the X-axis, the processing power acquired prior to processing to be performed by the allocation determination unit 16, while the size of every job is set on the Y-axis. Next, the point where the minimum value of the processing power is assigned an X-coordinate and the minimum value of the job size is assigned a Y-coordinate is joined using a solid line with the point where the maximum value of the processing power is assigned an X-coordinate and the maximum value of the job size is assigned a Y-coordinate. Moreover, a Y-coordinate Si(i=1 to m) is obtained, corresponding to a point on the above solid line at which the processing power Pi(i=1 to m) of the vacant client is assigned an X-coordinate (Step 153). In this embodiment, this Si(i=1 to m) is assumed to be an ideal job size to be transmitted to each vacant client having the processing power Pi(i=1 to m), and an optimum job size degree Di(i=1 to m), which is closest to the size Si(i=1 to m) of an unprocessed job, is obtained (Step 154). Here, the optimum job size degree Di(i=1 to m) is defined as "Di=1/|Si−S|" using the unprocessed job size S and the ideal job size Si(i=1 to m). Note that |Si−S| represents a distance between Si and S, and Di is assumed to be Max when Si=S.

Moreover, the allocation determination unit 16 obtains a latency weight Wi (i=1 to m) based on a latency of each vacant client Ci(i=1 to m) which has been acquired prior to processing by the allocation determination unit 16 (Step 155). Note that the latency weight can be calculated using a method similar to that described for the delay process.

FIG. 13(*b*) shows the latency and the latency weight, which are thus obtained. In the optimum client selection process, since the number of vacant clients is m, the latency weight Wi(i=1 to m) for the client Ci (i=1 to m) is depicted in the drawing.

Next, the allocation determination unit 16 obtains a job optimum degree Fi(i=1 to m)(Step 156). Note that the job optimum degree Fi(i=1 to m) can be figured out by use of "Fi=Wi×Di" using the latency weight Wi(i=1 to m) and the optimum job size degree Di(i=1 to m).

Thereafter, the allocation determination unit 16 identifies a vacant client which causes the job optimum degree Fi(i=1 to m) to be maximum (Step 157). FIG. 13(*c*) shows comparisons of the job optimum degrees Fi's (i=1 to m) thus obtained.

As a result, the allocation determination unit 16 returns the ID of the client to the control unit 12 (Step 158).

Note that it is assumed that the job optimum degree Fi of a client where Di=Max is larger than those of all the other clients where Di=Max is not achieved, irrespective of the latency and the latency weight.

Here, effects obtained by adopting the optimum client selection process will be described.

First, when there is a plurality of vacant clients, there is a method for uniformly distributing jobs to each client. However, if this method is adopted, jobs are collected in a client whose processing power is low. Thus, the overall throughput is not improved.

Second, there is a method for allocating jobs to each client by a master editor at his/her discretion. However, if this method is adopted, a throughput of the master editor is lowered. As a result, the throughput of the entire system is also lowered.

Third, there is a method for delivering a job by priority to a vacant client with a high processing power, among vacant clients. FIG. 14(*a*) shows an example of job allocation by adopting the above method. In this case, so-called starvation occurs, in which jobs are allocated only to a client A whose processing power is high, and not allocated to clients B and C whose processing power is low.

Note that the starvation is a situation described below.

The starvation means a situation that, in a multithread programming, if it is programmed in such a way that a thread in which priority is set high is repeatedly executed, a control indefinitely will not be assigned to a thread in which priority is set low. It is often believed that programming which causes such a situation is not necessarily appropriate.

In view of the above, in this embodiment, is the starvation means a situation that a job is indefinitely not allocated to a keyboard editor. While no particular problem will occur if the keyboard editor were a machine. However, in this embodiment, because the keyboard editor is human, a significant problem will be caused by the starvation.

Fourth, there is a method for delivering a job by priority to a client which has a long latency, among vacant clients. FIG. 14(*b*) shows an example of job allocation by adopting the above method. In this case, since a job 4 with a large amount of work may be allocated to a client C whose processing power is low, the throughput of the entire system is not optimized.

In contrast, when the optimum client selection process is adopted as shown in FIG. 14(*c*), each job is allocated to a client whose processing power is appropriate for processing the each job. Thus, the throughput is optimized.

Next, the keyboard caption editing system 20 in this embodiment will be described in detail.

Figure 15:
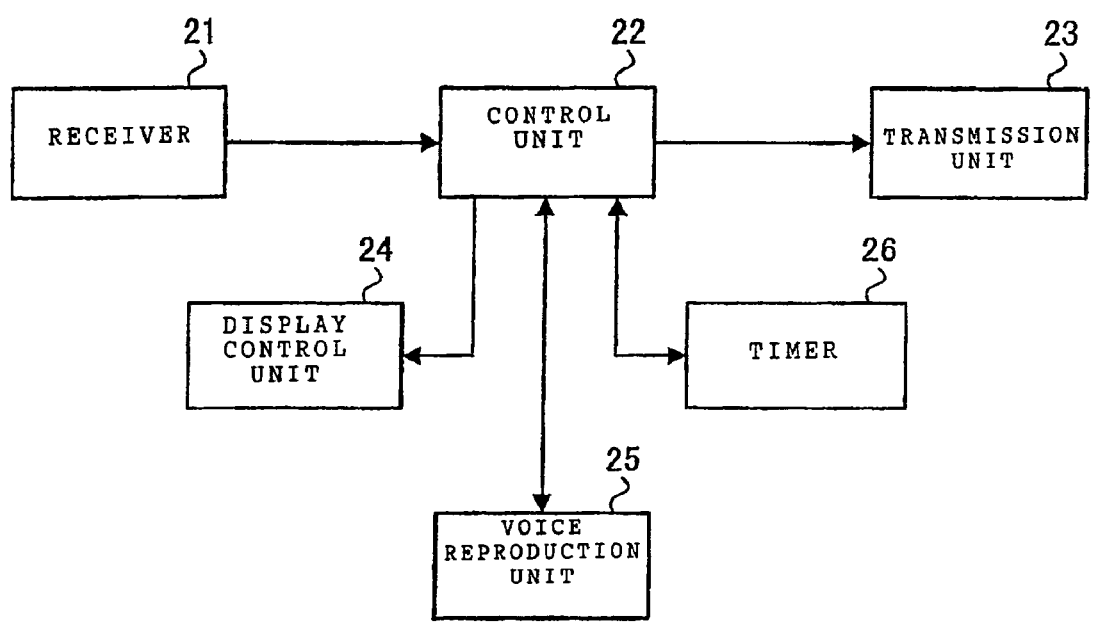
FIG. 15 is a block diagram showing a functional configuration for the keyboard caption editing system according to the embodiment of the present invention.

FIG. 15 is a block diagram showing a functional configuration of the keyboard caption editing system 20 in this embodiment. The keyboard caption editing system 20 includes a receiver 21, a control unit 22, a transmission unit 23, a display control unit 24, a voice reproduction unit 25, and a timer 26.

The receiver 21 has a function for receiving a job from the mouse caption editing system 20, the control unit 22 has a function for controlling all operations in the keyboard caption editing system 20, and the transmission unit 23 has a function for transmitting a job to the mouse caption editing system 10. Moreover, the display control unit 24 has a function for controlling a display of information on the screen of the keyboard caption editing system 20, the voice reproduction unit 25 has a function for reproducing a designated part of voice data stored in a voice data storage unit 40, and the timer 26 has a function as a timer.

Note that each functional part is achieved through coupling of software and hardware resources. To be more precise, a CPU of the keyboard caption editing system 20 reads a program for achieving the receiver 21, the control unit 22, the transmission unit 23, the display control unit 24, the voice reproduction unit 25, and the timer 26, from an external storage device into a main storage device, and performs processing.

The keyboard caption editing system 20 includes such a configuration to achieve the following functions.

A first one is an automatic jump function of jumping to an incorrect line.

In this function, when a correction for a certain incorrect line is completed, an automatic jump to another incorrect line is made, and a voice corresponding to the line is automatically reproduced. In an example shown in FIG. 16, a correction for "ondeando" on line 5 is completed, a jump is made to "deno katei" on line 11. When correction on line 11 is completed, a jump is made to "suimasen" on line 13.

With such a configuration, a keyboard editor can concentrate only on inputting of character strings. Thus, a high skill level is not required. In addition, editing efficiency is also enhanced.

A second one is an overlap width-provided reproduction-emphasizing function.

In this function, not only a voice corresponding to an incorrect line is reproduced, but also a voice in the vicinity thereof is reproduced. Moreover, a voice preceding the voice that corresponds to the incorrect line is faded-in, and a voice following the voice that corresponds to the incorrect line is faded-out, thus emphasizing the voice corresponding to the incorrect line. In this specification, a voice part which is faded-in or faded-out is assumed to be an "overlap width", and this function is referred to as the "overlap width-provided reproduction-emphasizing function".

Figure 17:
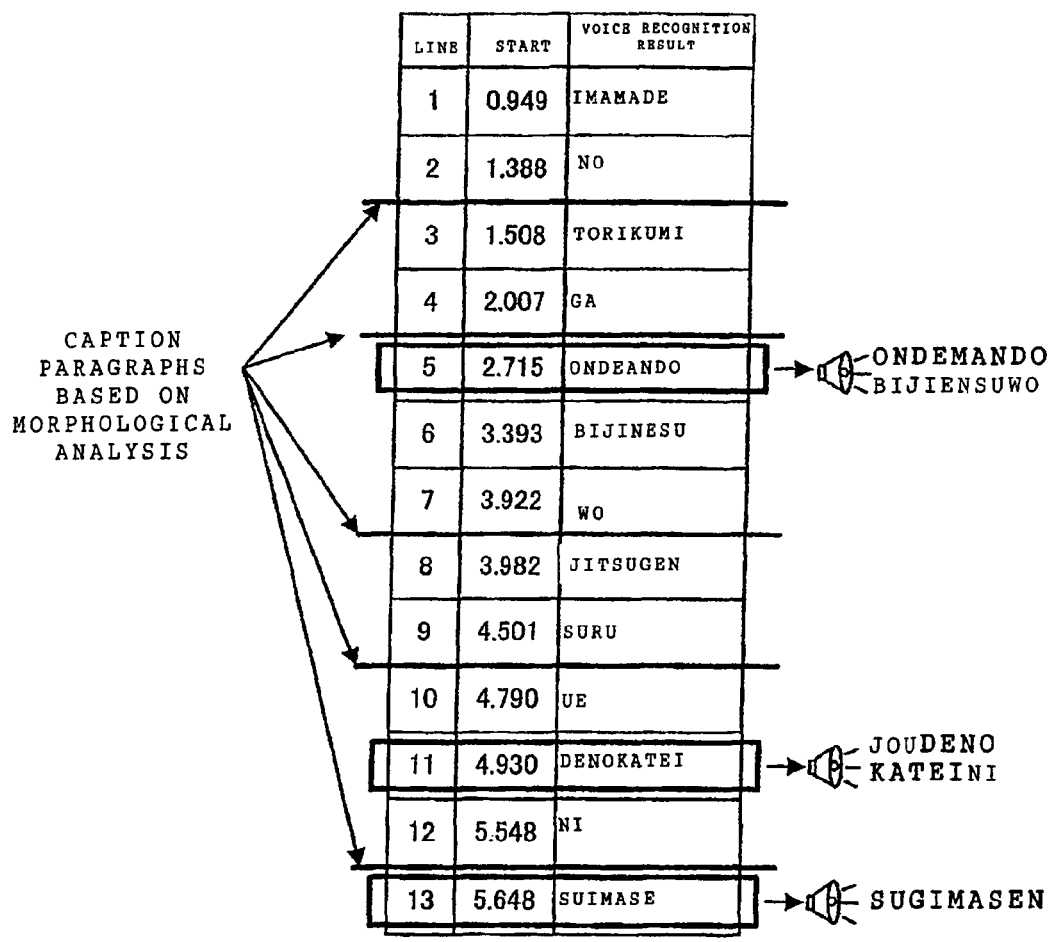
FIG. 17 is a diagram for explaining an overlap width-provided reproduction-emphasizing function of the keyboard caption editing system according to the embodiment of the present invention.

FIG. 17 shows an example where a caption paragraph, which is determined based on a morphological analysis, is set to be a range of an overlap width (a range from an overlap width to be faded-in to an overlap width to be faded-out).

Here, the caption paragraph is not a morpheme based on a part of speech such as a noun, a verb stem, a postpositional particle, and an auxiliary verb. For instance, when the sentence "Honjitsuwa seiten-nari" is taken into consideration, the respective blocks of "Honjitsuwa" and "seiten-nari" in the sentence independently have meanings, and the caption paragraph described above designates each of the above blocks. In generation of such a caption paragraph, it is possible to simply regularize the paragraph based on each part of speech for a morpheme. Furthermore, it is assumed that division is not usually made with respect to successive incorrect lines.

Note that the overlap width range can be determined in various ways according to a method for dividing caption lines. For example, determination using a fixed line is also conceivable.

A third one is a key-in coupling reproduction function.

Figure 18:
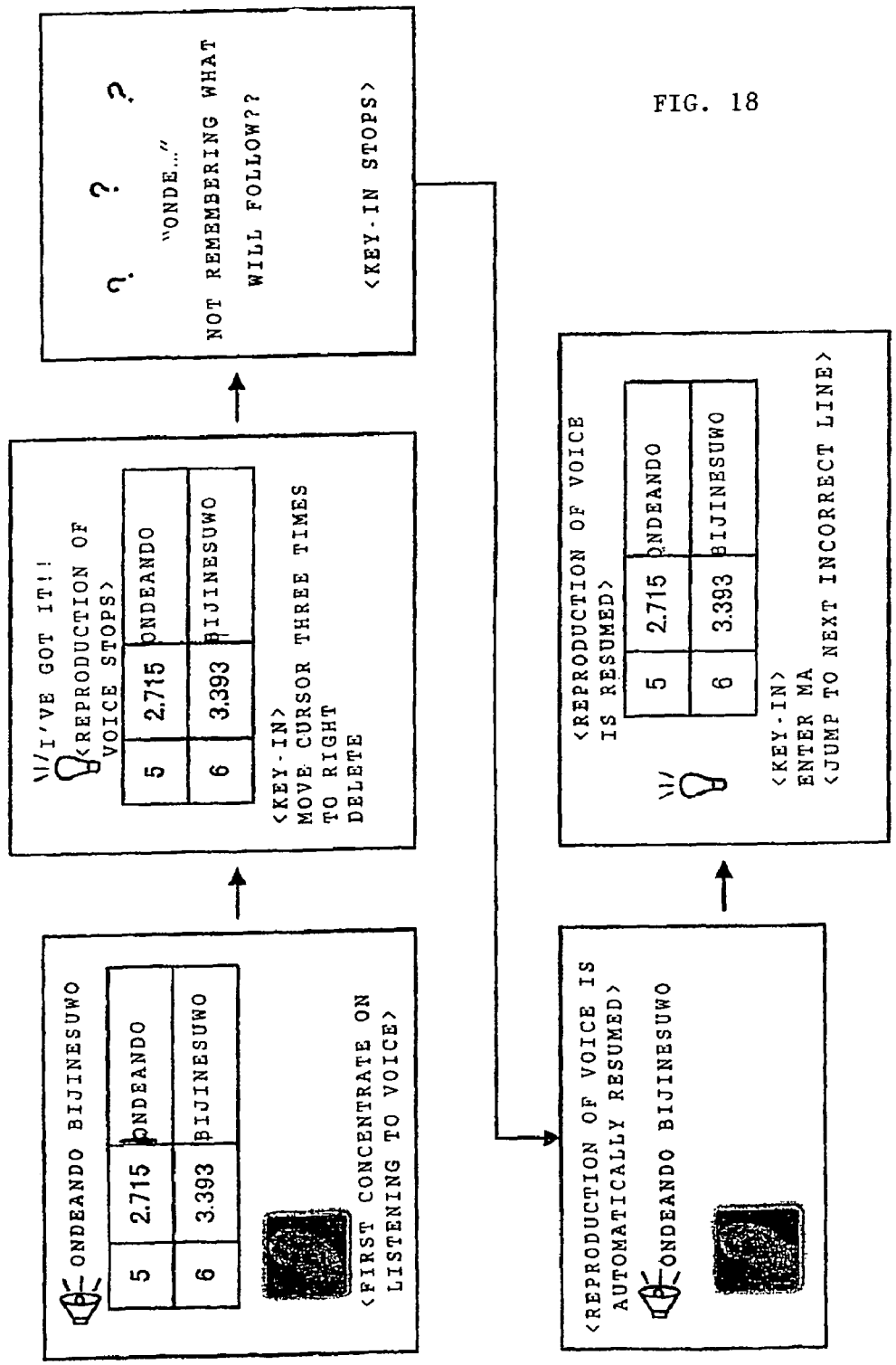
FIG. 18 is a diagram for explaining a key-in coupling reproduction function of the keyboard caption editing system according to the embodiment of the present invention.

In this function, as shown in FIG. 18, while the keyboard editor is performing key input, reproduction of a voice is suspended to avoid dampening his/her concentration on inputting. Once the keyboard editor stops the key input, dunning is made (voice dunning) so as to perform inputting through reproduction of a voice. This technique is different from the existing techniques such as blinking of a cursor, and a dunning message (pop-up message or voice message) such as "Please input your name correctly in the field." Accordingly, in this technique, when the key input is performed, information to be referred to is directly and dynamically reproduced. Therefore, the present technique gives higher effects compared with the existing techniques.

Note that the present technique is compared with the existing techniques in terms of the following three points: overhead, dunning effect, and utility.

That is, blinking of the cursor does not require a high overhead, but is inferior in dunning effect and the utility of information. The pop-up message and the voice messages have the dunning effect, but are inferior in the overhead, and the utility of information. In contrast, the present method is a superior method which does not require a high overhead, is expected to achieve the dunning effect, and has the utility of information.

Next, the operations of the keyboard caption editing system 20 for achieving the above functions will be described in detail.

Figure 19:
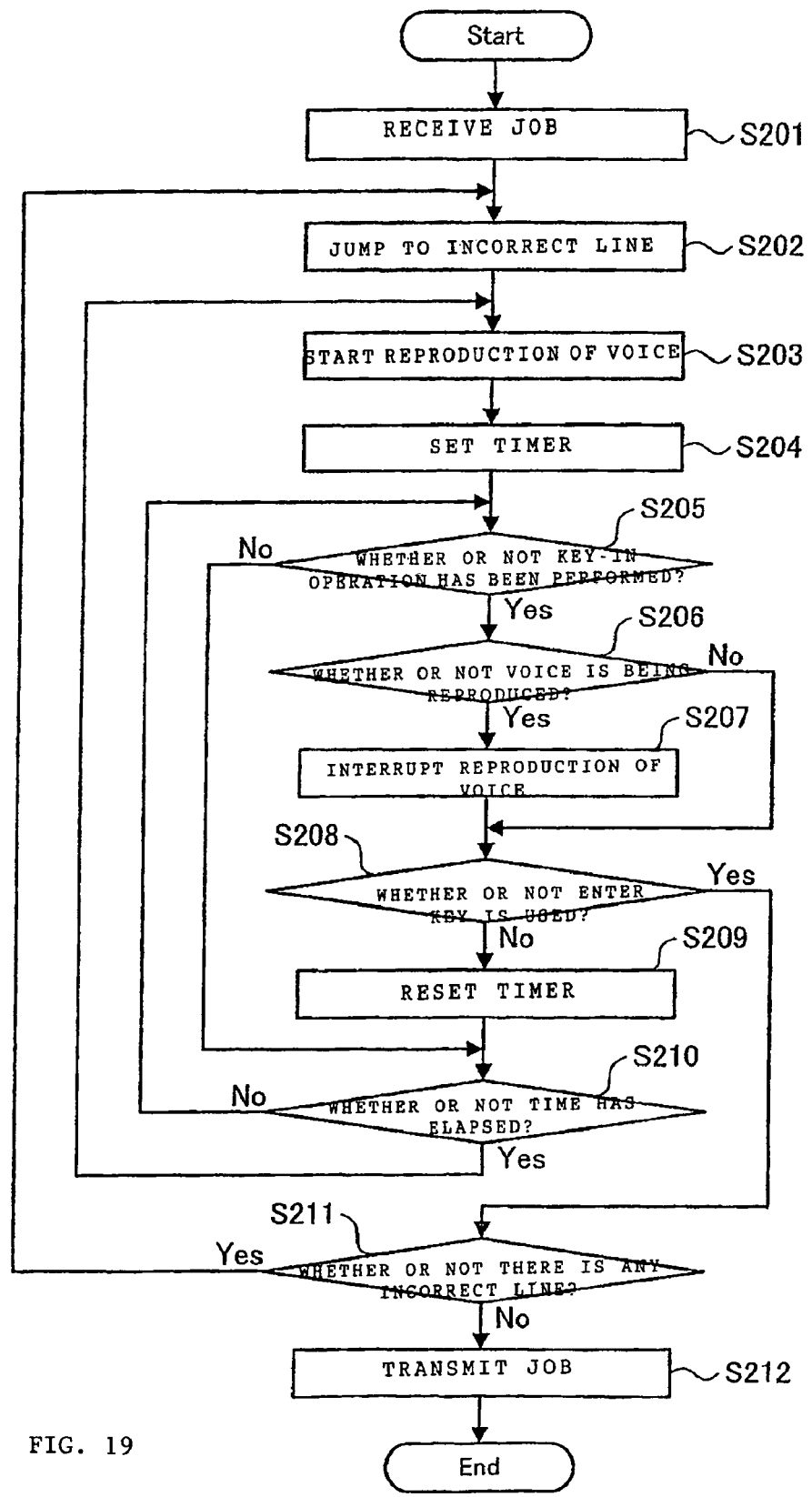
FIG. 19 is a flowchart showing operations of the keyboard caption editing system according to the embodiment of the present invention.

FIG. 19 is a flowchart showing the operations of the keyboard caption editing system 20.

First, the receiver 21 receives a job (Step 201). This job contains, as described above, information concerning each caption line to be displayed, which includes a start time in a voice file, a voice recognition result, and whether or not the caption line is incorrect.

Thus, a control is moved to the control unit 22, and the control unit 22 instructs the display control unit 24 to cause a keyboard focus to jump to an incorrect line. According to this instruction, the display control unit 24 causes the keyboard focus to jump to the incorrect line (Step 202). To be more precise, since the job contains information as to whether or not each caption line is an incorrect line, the display control unit 24 receives the information from the control unit 22, and thereby achieves such a jump to the incorrect line.

Meanwhile, the control unit 22 instructs the voice reproduction unit 25 to reproduce a voice corresponding to the incorrect line. According to this instruction, the voice production unit 25 reproduces the voice (Step 203). To be more precise, since the job contains information as to the start time, the voice reproduction unit 25 receives the information from the control unit 22. Then, the voice reproduction unit 25 acquires voice data stored in the voice data storage unit 40, and reproduces a part designated by the received information. Moreover, in this event, a control is also made so as to cause a voice preceding the voice corresponding to the incorrect line to be faded-in, and to cause a voice following the voice corresponding to the incorrect line to be faded-out.

Meanwhile, the control unit 22 instructs the timer 26 to set a timer. According to this instruction, the timer 26 sets the timer (Step 204). In the case where there is no key input, when the time thus set elapses, reproduction of the voice is resumed. Therefore, a time to be set here is one which is obtained by adding with a length of the voice reproduced to a constant latency.

Next, the control unit 22 determines whether or not key input is made using a keyboard (Step 205).

As a result, when it is determined that no key input has been made, the control unit 22 determines whether or not the set time has elapsed (Step 210). When the set time has not elapsed, determination in Step 205 is repeated until the set time elapses. When the time has elapsed, reproduction of the voice is resumed (Step 203).

Meanwhile, when it is determined that key input has been made, the control unit 22 determines whether or not a voice has been reproduced (Step 206). When the voice has been reproduced, reproduction of the voice is interrupted (Step 207). It is then determined whether or not key input is made by use of an enter key (Step 208). As a result, when key input is not made by using the enter key, the control unit 22 instructs the timer 26 to reset the timer. According to this instruction, the timer 26 resets the timer (Step 209). That is, a setting in which reproduction of the voice is resumed when a certain period of time elapses after the start of the voice reproduction in Step 203 is changed to a setting in which reproduction of the voice is resumed when a certain period of time elapses after a current key input.

Subsequently, the control unit 22 determines whether or not the set time has elapsed (Step 210). When the set time has not elapsed, determination in Step 205 is repeated until the set time elapses. When the set time has elapsed, the reproduction of the voice is resumed (Step 203). Meanwhile, when it is determined in Step 208 that key input is made by using the enter key, the control unit 22 determines whether or not there is a following incorrect line (Step 211). To be more precise, since the job contains information as to whether or not each caption line is incorrect, the control unit 22 determines whether or not there is an incorrect line based on the information.

As a result, when there is an incorrect line, the processing returns to Step 202. When there is no incorrect line, a job of a confirmation request is transmitted to the transmission unit 23, and the transmission unit 23 transmits the job to the mouse caption editing system 10 (Step 212).

Note that it is assumed that it is possible to freely set a list on a period of time for reproducing a voice, and on the specific keys for reproducing/suspending a voice.

The description of this embodiment will be finished with those described above.

A configuration has been adopted in this embodiment, in which a system for identifying an incorrect line and entering an editing result is separated from a system for editing an incorrect line. In such a configuration, it is possible to allow a person, who is highly skilled and in a responsible position, to engage with only the operations of the former system, and to allow a person with a low skill level to engage with the operations of the latter system. Hence, a great reduction in labor costs can be expected. Furthermore, in the existing caption editing systems, there have been many problems as described above, hence making it difficult to ask volunteers' cooperation in editing work. However, the present invention realizes cooperation of volunteers for captioning all across the country through the Internet and the like. Once such an infrastructure is consolidated, social effects to the pervasion of captioning would be immense.

Moreover, a configuration has been adopted in this embodiment, in which the operations with the mouse for identifying an incorrect line and entering an editing result are separated from the operations with the keyboard for correcting an incorrect line. Adoption of such configuration eliminates need of operations by moving the operator's hand back and forth between the mouse and the keyboard. Hence, great enhancement in operationality can be expected.

Furthermore, this embodiment has achieved the automatic jump function, the overlap width-provided reproduction-emphasizing function, and the key-in coupling reproduction function, in correcting incorrect lines. With these functions, operationality in correcting incorrect lines is enhanced.

Moreover, in this embodiment, it is assumed that the processing power varies among keyboard editors, and dynamically varies. Further, for each job, it is assumed that a timing of its generation and a timing of its end are irregular, and its size is also indefinite. Under such conditions, allocation of a job to the keyboard caption editing system is optimized, whereby occurrence of starvation, deadlock, and lowering of throughput are avoided. Therefore, it becomes possible to secure the various types of labors, and shorten their working hour. Thus, it is possible to greatly cut labor costs.

Figure 20:
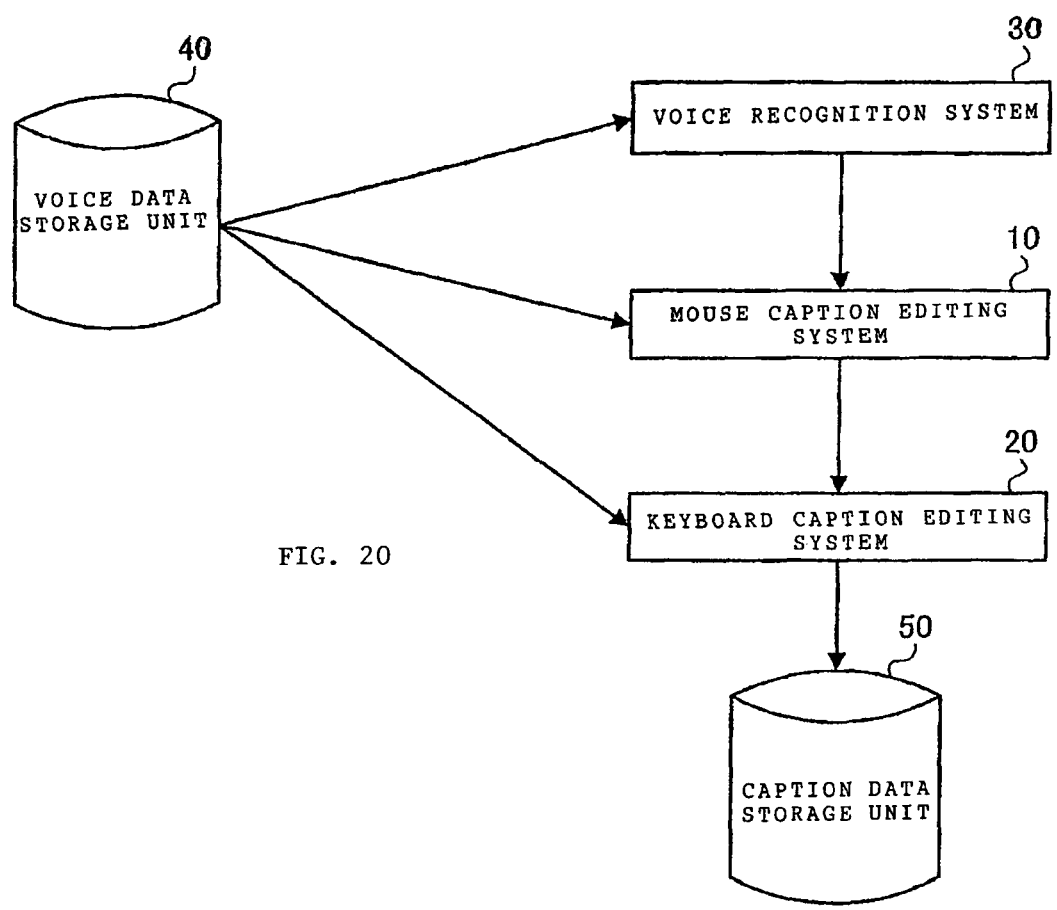
FIG. 20 is a block diagram showing a system configuration according to a second embodiment of the present invention.

FIG. 20 is a block diagram showing a configuration of a caption editing system in this embodiment. This caption editing system includes a mouse caption editing system 10, a keyboard caption editing system 20, a voice recognition system 30, a voice data storage unit 40, and a caption data storage unit 50. In the first embodiment, inputting of a caption from the keyboard caption editing system 20 to the caption data storage unit 50 is performed through the mouse caption editing system 10. In the second embodiment, imputing of a caption from the keyboard caption editing system 20 to the caption data storage unit 50 is directly effected. While not shown in the drawing, a display unit acquires in real time a caption inputted in the caption data storage unit 50, and displays the caption in synchronization with reproduction of a voice based on voice data stored in the voice data storage unit 40.

Note that a hardware configuration of a computer, which is suitable for use as the mouse caption editing system 10 and the keyboard caption editing system 20, is similar to that shown in FIG. 3 in this embodiment. Thus, detailed description is omitted.

Figure 8:
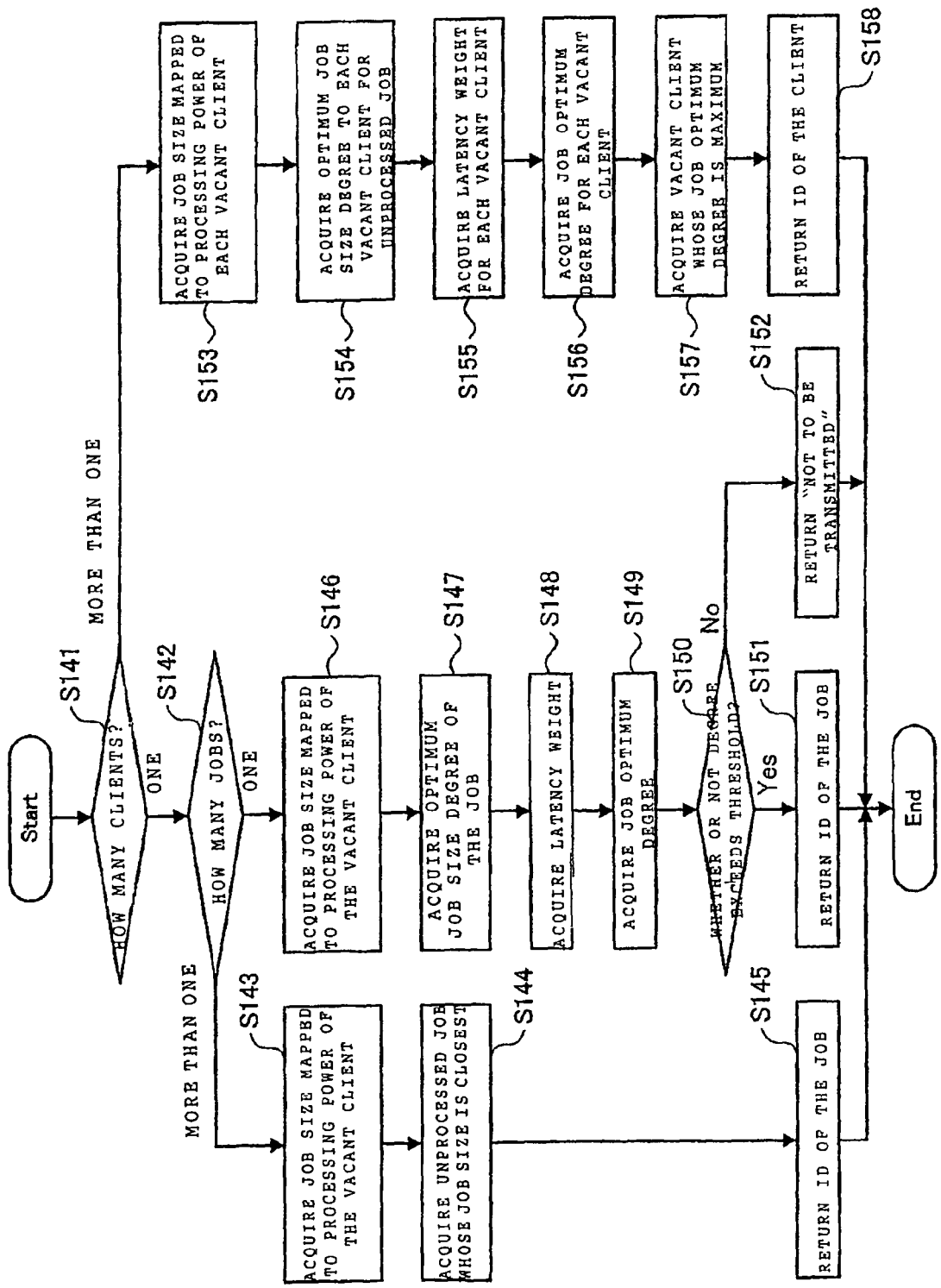
FIG. 8 is still another flowchart showing operations of the mouse caption editing system according to the embodiment of the present invention.

In addition, since the mouse caption editing system 10 in this embodiment does not receive a job from the key board caption editing system 20, operations shown in FIGS. 6 and 8 are performed but those in FIG. 7 are not performed.

Furthermore, the keyboard caption editing system 20 of this embodiment performs operations almost following FIG. 19. However, in Step 212, instead of processing of transmitting a job to the mouse caption editing system 10, inputting of an edited caption in the caption data storage unit 50 is performed.

Here, FIGS. 21(*a*) and 21(*b*) show display examples in this embodiment.

FIG. 21(*a*) is a diagram showing an example of a display showing parts where editing on captions is completed only in a consecutive manner. In this example, editing works are all completed up to the part "Imamadeno torikumi ga, ondemando bijinesu wo jitsugensuru uedeno kateinisugimasen." Suppose, now, there are two consecutive voices following the above part, one saying "Genzai, watashitachi wa, kakono torikumi wo kibantoshi, tuginaru kadaini torikundeimasu.", and the other saying "Sore wa, shijouno supi-do to, jyugyouin no rikuesuto ni sokuoudekiru ondemandokigyou eno henkakudesu.", and editing works for these voices are respectively requested to different keyboard editors. In this case, even if an editing work for the latter voice is completed, captions corresponding to these voices will not be displayed until an editing work for the former work is also completed.

Meanwhile, FIG. 21(*b*) is an example of a display showing all parts where editing on captions is completed. In this example, editing on captions with respect to "Genzai, watashitachi wa, kakono torikumi wo kibantoshi, tuginaru kadaini torikundeimasu." is completed. However, editing on captions with respect to "Imamadeno torikumi ga, ondemando bijinesu wo jitsugensuru uedeno kateinisugimasen." and "Sore wa, shijouno supi-do to, jyugyouin no rikuesuto ni sokuoudekiru ondemandokigyou eno henkakudesu." is not completed, and the captions are displayed as they are not entered.

Note that, for a display with the captions not entered, it is also possible to adopt a method for displaying information indicating only the existence of the sentence at the place where there are the captions not yet entered. It is also possible to adopt a method in which a correct character string and a character string, which has not been entered, are separated in display modes, as shown in FIG. 21(*b*). In the latter case, it is allowed to refer to information as to the degree of certainty set by a master editor.

The description of this embodiment will be finished with those described above.

This embodiment has an effect that a caption can be displayed in real time, in addition to the effects of the first embodiment.

Meanwhile, in the above first and second embodiments, there is provided the voice data storage unit 40 which can be commonly accessed by both the mouse caption editing system 10 and the keyboard caption editing system 20, and in which voice data are stored. However, it is not necessarily the case where the voice data are commonly accessed by both the mouse caption editing system 10 and the keyboard caption editing system 20. For example, the embodiment may be configured is such a manner that, with voice data stored in the mouse caption editing system 10, only a necessary part of the voice data is cut out, and is transmitted to the keyboard caption editing system 20 along with caption data.

Furthermore, the first and second embodiments are configured in such a manner that transmission of caption data is performed between the mouse caption editing system 10 and the keyboard caption editing system 20. However, it is also possible to configure the embodiments not to transmit the caption data between these systems. That is, the embodiments may be configured in such a way that caption data are stored in a storage area which can be commonly accessed by both the mouse caption editing system 10 and the keyboard caption editing system 20, and address information for the storage area and positional information of incorrect lines in the caption data are transmitted to the keyboard caption editing system 20 from the mouse caption editing system 10.

Moreover, it is also possible to incorporate the following technologies into the embodiments.

1. Speech Rate Conversion In the overlap width-provided reproduction-emphasizing function, for emphasizing a voice corresponding to an incorrect line, the voice will "slowly" be reproduced by employing a speech rate conversion technology. However, since processing of a speech conversion is heavy in general, care must be taken not to cause performance of other processing to be lowered due to introduction of this technology.

2. Voice Command When one reproduces or stops a voice, he/she can use a voice command such as "Reproduce" or "Stop." However, since processing of the voice command is heavy in general, care must be taken not to cause the performance of the other processing to be lowered due to the introduction of this technology.

Further, it is possible to give further consideration to a display, i.e. "roughly correct caption line" described in the first embodiment. For example, the display example shown in FIG. 21(*b*) can be perceived as a display example for a "roughly correct caption." That is, according to a degree of certainty, it is possible to display a "roughly correct caption line" in a form being different from that for a "correct caption line." In FIG. 21(*b*), a "correct caption line" is displayed in normal characteristic type, while an "incorrect caption line" is displayed in italic type.

Advantages of the present invention when compared with those of the exiting technology are summed up as follows.

1) The existing technology includes only five basic functions: move of voice focus, voice reproduction, stop of voice reproduction, move of keyboard focus, and division/concatenation of line. Thus, an editor must perform other operations for identifying and correcting such incorrect lines. In addition, such wasteful processing occurs in every caption line, thus causing the number of occurrences of such processes to be large.

2) In the present invention, the master editor checks the degree of certainty of each caption line according to an automatically reproduced voice, and only submits to a keyboard editor by a unit of a necessary paragraph. It is not basically necessary to perform operations such as stop and reproduction of a voice, and pointing of a reproduction part. Furthermore, neither is it necessary for one to memorize correct character strings. Work for entering a caption line as a final one is the same as that of the conventional work.

3) In the present invention, the keyboard editor only edits incorrect lines with the keyboard, and enters the lines at the end. Accordingly, as described above, labor cost is low, and editing is easy even for a low skilled person.

Here, to be more precise, the existing technology and the present invention are compared with respect to editing procedures on a single incorrect line. FIG. 22 is a diagram showing steps of handling and operations related to human hands, eyes, and ears. Note that, here, as a typical example, a case where one hears voices three times is assumed.

As is obvious from FIG. 22, both the mouse caption editing system and the keyboard caption editing system are superior to a conventional caption editing system in terms of operationality and costs.

Finally, applications of the present invention will be described.

For example, an application to music is considered.

It is not rare that it is not possible to acquire a music score and/or a song for a desired music material. A work for appending a music score and a song to such a music material is so laborious as well as a work for appending captions. In the present invention, even if the voice recognition system is restated as music recognition software, and a caption is restated as a music score and a song, the effects of the present invention are not changed.

Incidentally, it is also possible to apply the present invention to annotate a video image. There are often such cases where an annotation is embedded into a desired video material as a time stamp, and is used as an index for a search system or the like. Such a work could happen to involve a large amount of work depending on the volume of contents. In that work, it is possible to restate the voice recognition system as a video image recognition system, and to restate a caption as an annotation in a video image, and to restart voice dunning as dunning by a video image or dunning by a voice corresponding to a video image.

Moreover, an application to an automatic content generation for a sentence, a rich content, or the like is also assumed. Recently, it is not rare that contents are automatically generated by use of a computer. There is, of course, a case where people make contents. However, it is necessary to assume some errors and changes are included in the contents. It is possible to restate the voice recognition system in the present invention as a content generation system, to restate a caption as contents, and to restate voice dunning as dunning by a content display or dunning by a voice acquired by performing a voice synthesis for the contents.

Although the preferred embodiments of the present invention have been described in detail, it should be understood that various changes, substitutions and alternations can be made therein without departing from spirit and scope of the inventions as defined by the appended claims.

What is claimed is:

1. A computer system for editing text data, which have been created on a basis of a voice or a video image, comprising:
   a first computer for outputting one or more of said voice or said video image, and for identifying text data which needs to be edited, in response to a received instruction, the text data comprising a plurality of parts of text data;
   a plurality of computers for outputting said voice or said video image, and for editing said plurality of parts of text data, which have been identified by said first computer, in response to said received instruction; and
   an allocation determination unit, said allocation determination unit retrieving each of the one or more of said voice or said video images and allocating each of said one or more of said voice or said video images to one of the plurality of computers by optimally selecting one of the plurality of computers, wherein said optimally selecting comprises:
      determining a number of vacant client computers;
      determining a number of said one or more said voice or said video images have not been processed;
      processing one of the one or more of said voice or said video images by a vacant client computer responsive to determining that the number of one said one or more said voice or said video images that have not been processed is greater than one, and the number vacant client computers is one, wherein processing requirements of said one of the one or more of said voice or said video images matches processing requirements of the vacant client computer;
      processing one of the one or more of said voice or said video images by a vacant client computer responsive to determining that the number of one said one or more said voice or said video images that have not been processed is one, and the number vacant client computers is greater than one, the processing comprising calculating a job optimum degree, the job optimum degree based on a weighted latency of each of the vacant client computers, wherein the weighted latency does not correspond linearly with the latency, and the processing is performed on the vacant client computer with a maximum job optimum degree; and
      delaying the processing one of the one or more of said voice or said video images by a vacant client computer responsive to determining that the number of one said one or more said voice or said video images that have not been processed is one, and the number vacant client computers is one, the delaying comprising calculating a job optimum degree, the job optimum degree based on a weighted latency of the vacant client computer, wherein the weighted latency does not correspond linearly with the latency, and preventing processing of the one of said one or more of said voice or said video images by the vacant client computer in response to determining that the job optimum degree exceeds a threshold;
   wherein said first computer distributes said voice or said video image, one of said plurality of said parts of text data which needs to be edited, and one or more editing instructions, to each of said plurality of computers for parallel processing, each of said plurality of computers automatically outputting said voice or said video image, which corresponds to said one of said plurality of parts of text data, prior to editing said plurality of parts of text data.

2. The computer system according to claim 1, wherein said first computer identifies said plurality of parts of text data, in response to an instruction from a pointing device, and each of said plurality of parts of text data is edited by one of said plurality of computers in response to a received keyboard generated instruction.

3. The computer system according to claim 1, wherein said first computer performs a process for specifying a location for editing on said plurality of parts of text data, said editing being performed by said plurality of computers.

4. The computer system according to claim 1, wherein each of said plurality of computers does not edit said one of said plurality of parts of text data, and outputs a second part of said plurality of parts of text data, which needs to be edited.

5. The computer system according to claim 1, wherein each of said plurality of computers outputs an additional voice or an additional video image, each corresponding to other parts of text data related to said one of said plurality of parts of text data which needs to be edited, in a form which is different from that for said voice or said video image, each corresponding to said one of said plurality of parts of text data.

6. The computer system according to claim 1, wherein each of the plurality of computers stops outputting said voice or said video image, corresponding to said one of said plurality of parts of text data, in response to inputting of editing data for one of said plurality of parts of text data.

7. The computer system according to claim 1, wherein the plurality of computers comprises at least a second computer and a third computer, said third computer for outputting said one of said plurality of parts of text data which has been edited by said second computer.

8. The computer system according to claim 7, wherein, in response to determining that all of said editing has been completed, said third computer outputs said one of said plurality of parts of text data which has been edited prior to said second computer outputting said one of said plurality of parts of text data.

9. The computer system according to claim 7, wherein, said one of said plurality of parts of text data comprises an edited segment of text data and an unedited segment of text data, said third computer outputs said edited segment of text data and said unedited segment of text data prior to said second computer outputting said one of said plurality of parts of text data.

10. The computer system according to claim 1 further comprising a warning generation unit, the warning generation unit issuing warnings in response to determining that the text data which needs to be edited is accumulating, and in response to determining a number of the plurality of computers that are not performing operations is increasing.

* * * * *